US012032163B2

(12) United States Patent
Yoshida et al.

(10) Patent No.: US 12,032,163 B2
(45) Date of Patent: Jul. 9, 2024

(54) WEARABLE DEVICE, CONTROL DEVICE, SYSTEM, CONTROL METHOD, AND NON-TRANSITORY COMPUTER READABLE MEDIUM

(71) Applicant: CANON KABUSHIKI KAISHA, Tokyo (JP)

(72) Inventors: Takehiro Yoshida, Tokyo (JP); Sanae Yamaguchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/059,867

(22) Filed: Nov. 29, 2022

(65) Prior Publication Data

US 2023/0168505 A1 Jun. 1, 2023

(30) Foreign Application Priority Data

Nov. 30, 2021 (JP) .................................. 2021-194334

(51) Int. Cl.
*G02B 27/01* (2006.01)
*H04R 1/10* (2006.01)
(52) U.S. Cl.
CPC ......... *G02B 27/017* (2013.01); *H04R 1/1091* (2013.01); *G02B 2027/014* (2013.01); *G02B 2027/0147* (2013.01); *H04R 2460/13* (2013.01)

(58) Field of Classification Search
CPC .. G02B 27/017; G02B 27/0093; G02B 27/02; G02B 2027/014; G02B 2027/0147; G02B 2027/0138; G02B 2027/0141; G02B 2027/0178; H04R 1/1091; H04R 3/12; H04R 5/033; H04R 2460/13; G06F 3/011
See application file for complete search history.

(56) References Cited

U.S. PATENT DOCUMENTS

2019/0370450 A1* 12/2019 Fletcher ............... G06V 40/197
2023/0138204 A1* 5/2023 Penugonda ........... G06T 19/006
715/705

FOREIGN PATENT DOCUMENTS

JP 2016197816 A * 11/2016
JP 2016197816 A 11/2016

* cited by examiner

*Primary Examiner* — Brent D Castiaux
(74) *Attorney, Agent, or Firm* — Canon U.S.A., Inc., IP Division

(57) ABSTRACT

A wearable device that is usable in a plurality of usage forms which has a notification unit that notifies a user of information indicating a recommended usage form out of the plurality of usage forms, the information being determined based on information relating to an external environment.

31 Claims, 16 Drawing Sheets

SERVER 30

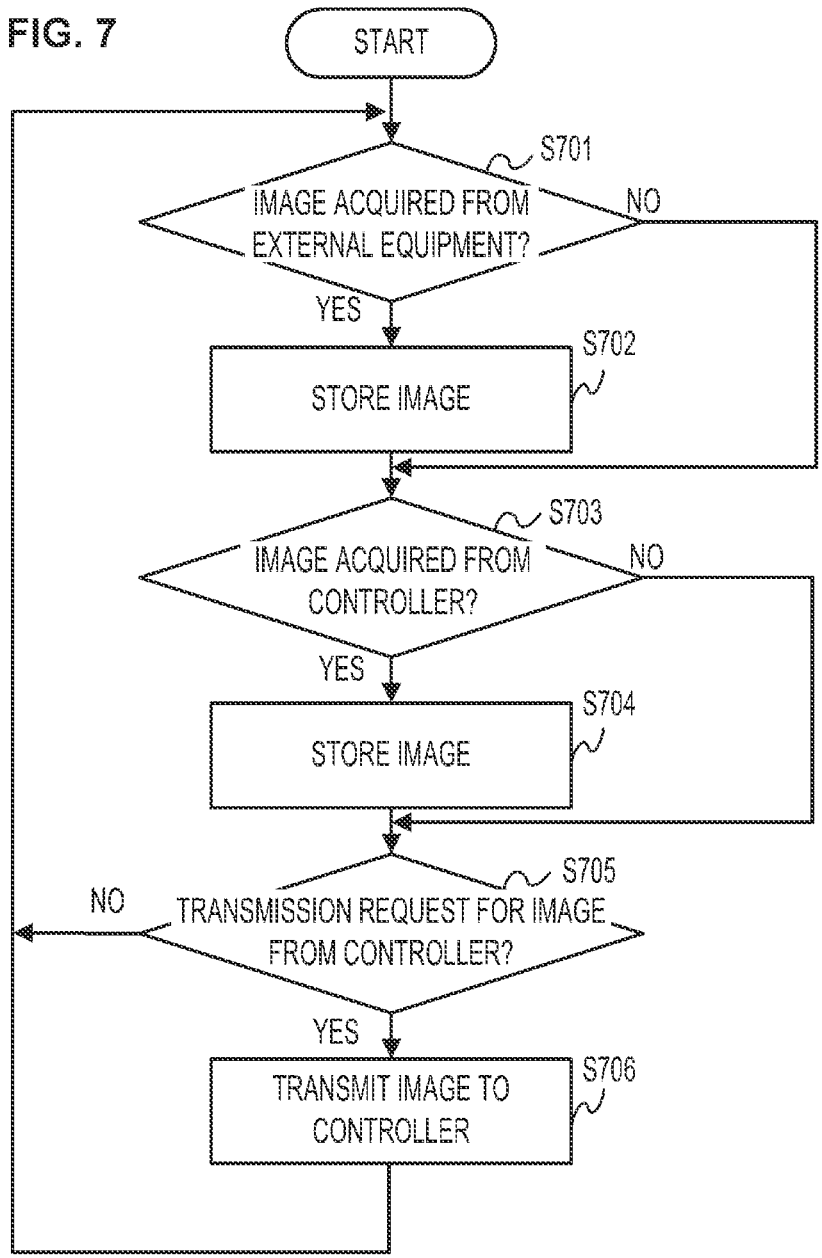

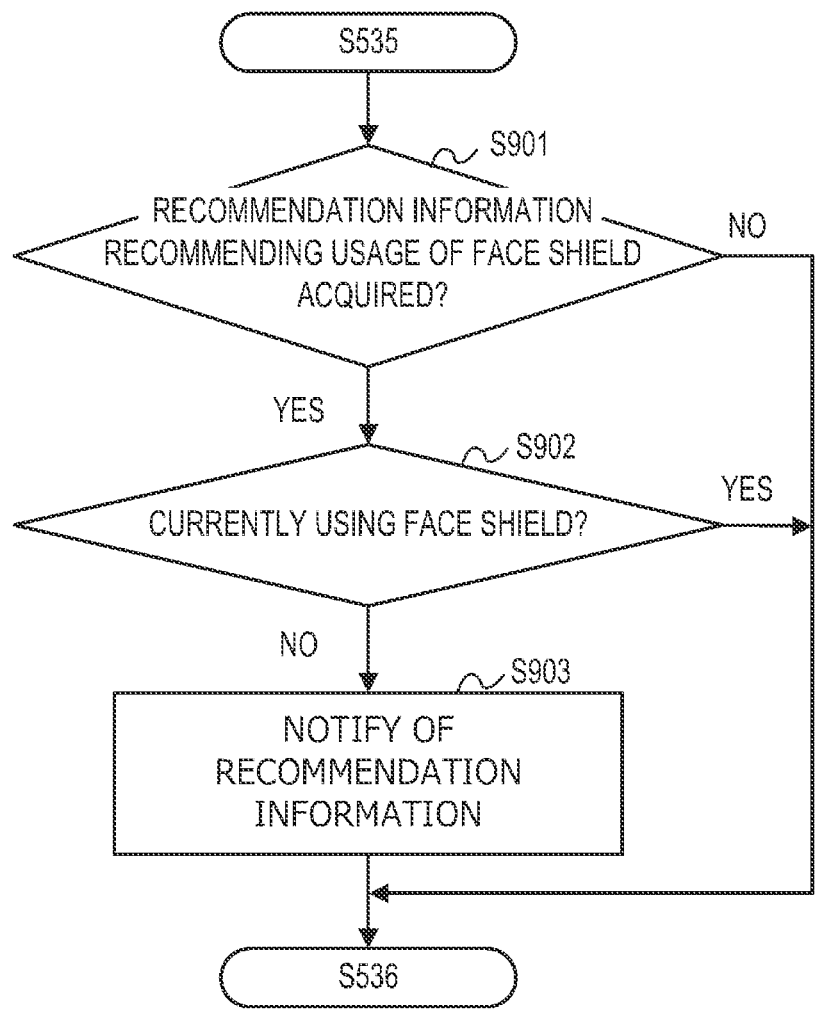

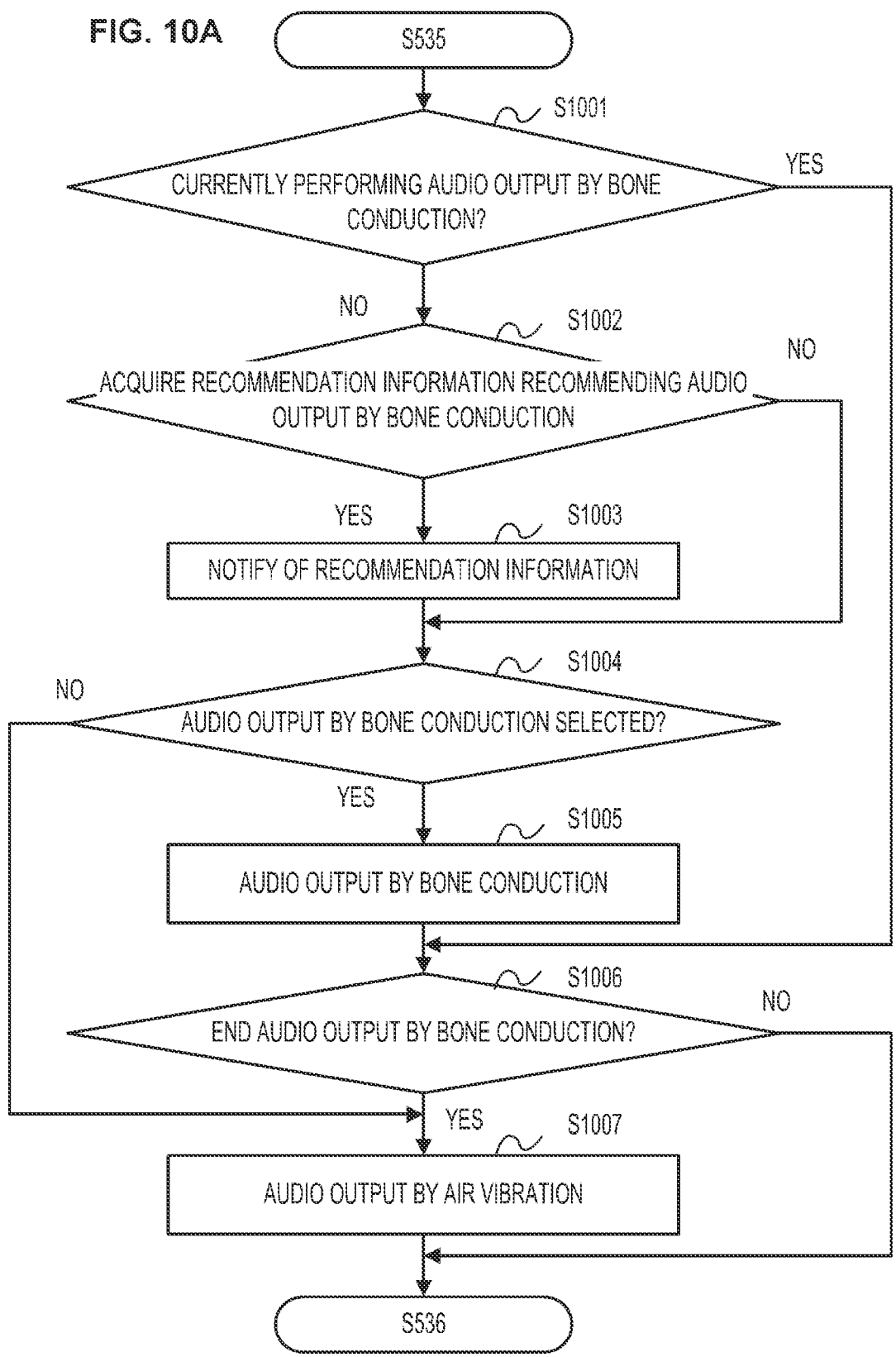

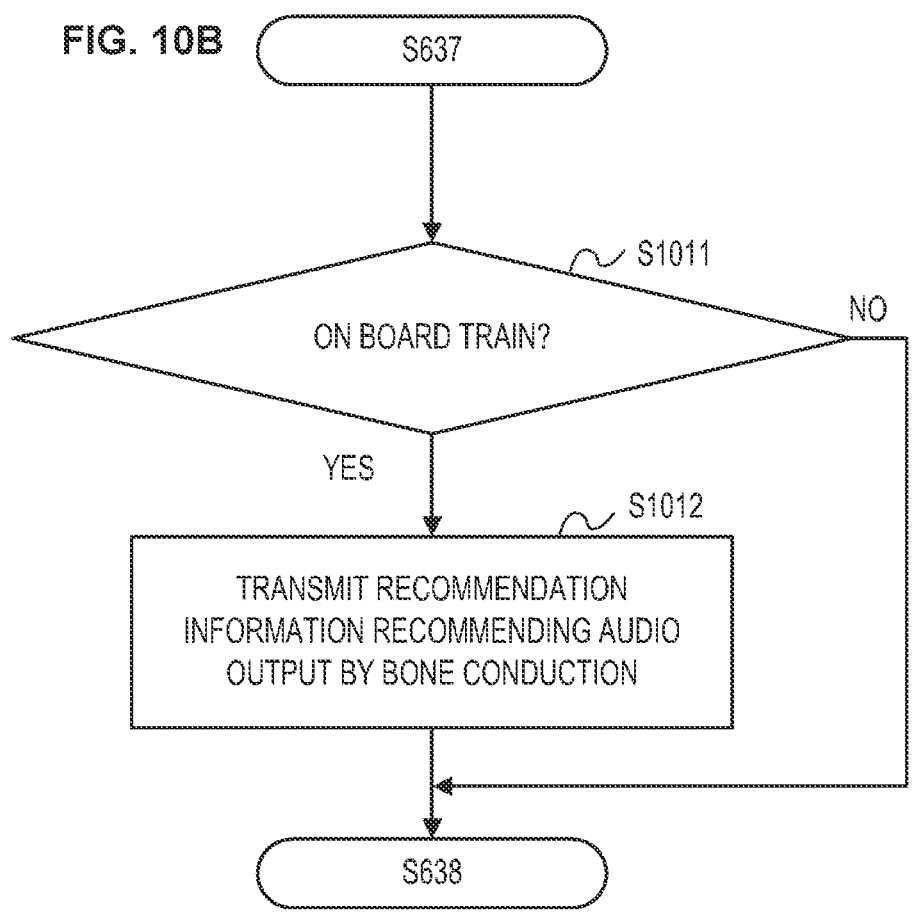

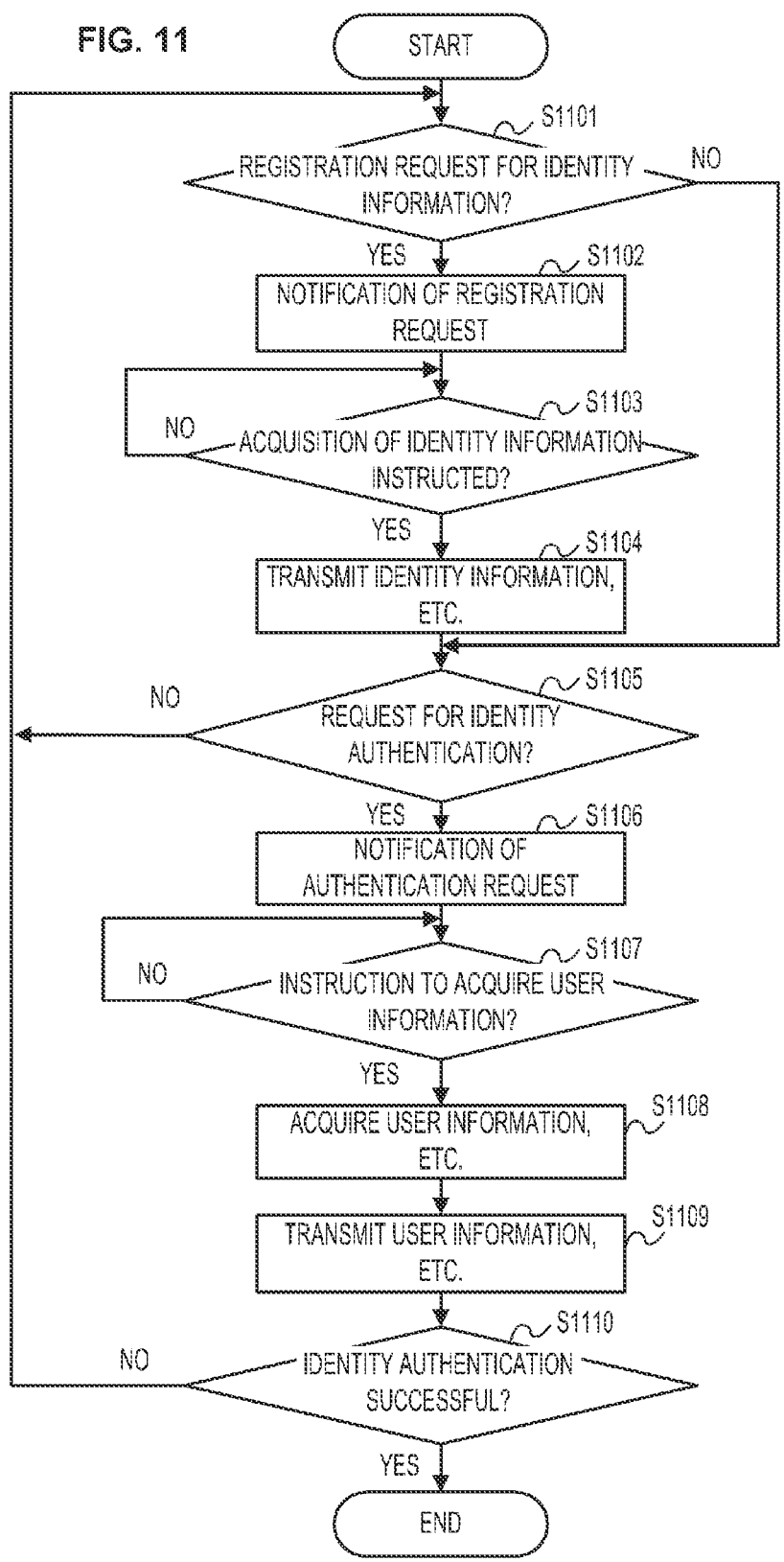

WEARABLE DEVICE, CONTROL DEVICE, SYSTEM, CONTROL METHOD, AND NON-TRANSITORY COMPUTER READABLE MEDIUM

BACKGROUND

Field

The present disclosure relates to a wearable device, a control device, a system, a control method, and a non-transitory computer readable medium.

Description of the Related Art

Japanese Patent Application Publication No. 2016-197816 discloses a wearable device worn on the head (face). Examples of wearable devices worn on the head include video see-through equipment, optical see-through equipment, face shields, and so forth. Accordingly, purchasing wearable devices for each usage purposes necessitates securing space for storing a plurality of wearable devices, and also necessitates great expenditures for purchasing.

Japanese Patent Application Publication No. 2016-197816 discloses technology where the wearable device can be switched by user operations between a state in which images of the surroundings that are captured are presented to a user (video see-through state) and a state in which the user can directly visually perceive the surroundings in front of him/herself (optical see-through state), or the switching takes place in accordance with changes in the environment of the surroundings. Purchasing a wearable device that uses the technology described in Japanese Patent Application Publication No. 2016-197816 does away with the need to purchase each of video see-through type equipment and optical see-through type equipment, and accordingly less space is needed for storing the wearable device.

However, in Japanese Patent Application Publication No. 2016-197816, users wearing wearable devices are often engrossed in the displayed images, and it is difficult to determine the timing at which to switch the state (usage form) of the wearable device. Also, when the state of the wearable device is automatically switched without notifying the user, the user may find the sudden change in the field of view to be disturbing.

SUMMARY

Accordingly, an object of the present disclosure is to provide technology in which a user can readily understand a time for switching the form of a wearable device that is usable in a plurality of usage forms.

An aspect of the present disclosure is a wearable device that is usable in a plurality of usage forms and that is worn on a head of a user, the wearable device including: a display; and at least one memory and at least one processor which function as a notification unit configured to notify the user, via the display, of recommendation information indicating a recommended usage form out of the plurality of usage forms, the recommendation information being information determined on a basis of information relating to an external environment.

An aspect of the present disclosure is a control device that controls a wearable device that is usable in a plurality of usage forms and that is worn on a head of a user, the control device comprising: at least one memory and at least one processor which function as determining unit configured to determine a recommended usage form out of the plurality of usage forms, on a basis of information relating to an external environment, and control unit configured to control the wearable device to notify the user of information indicating the recommended usage form, via a display that the wearable device has.

An aspect of the present disclosure is a system that has a wearable device that is usable in a plurality of usage forms and that is worn on a head of a user, and a control device that controls the wearable device, wherein the control unit determines a recommended usage form out of the plurality of usage forms, on a basis of information relating to an external environment, and the wearable device has a display, and notifies the user, via the display, of information indicating the recommended usage form.

An aspect of the present disclosure is a control method of a wearable device that is usable in a plurality of usage forms and that is worn on a head of a user, the control method comprising: acquiring information indicating a recommended usage form out of the plurality of usage forms, the information determined on a basis of information relating to an external environment; and notifying the user of the information indicating the recommended usage form via a display that the wearable device has.

An aspect of the present disclosure is a control method of a wearable device that is usable in a plurality of usage forms and that is worn on a head of a user, the control method comprising: determining a recommended usage form out of the plurality of usage forms on a basis of information relating to an external environment; and controlling the wearable device to notify the user of information indicating the recommended usage form via a display that the wearable device has.

An aspect of the present disclosure is a control method of a system that has a wearable device that is usable in a plurality of usage forms and that is worn on a head of a user, and a control device that controls the wearable device, the control method comprising: determining a recommended usage form out of the plurality of usage forms on a basis of information relating to an external environment; and notifying the user of information indicating the recommended usage form via a display that the wearable device has.

Further features of the present disclosure will become apparent from the following description of exemplary embodiments with reference to the attached drawings.

BRIEF DESCRIPTION OF THE DRAWINGS

FIG. 7 is a flowchart showing processing performed at the server according to the first embodiment.

FIGS. 9A and 9B are flowcharts showing processing according to a third embodiment.

FIGS. 10A and 10B are flowcharts showing processing according to a fourth embodiment.

FIG. 11 is a flowchart showing processing performed at a wearable device according to a sixth embodiment.

DESCRIPTION OF THE EMBODIMENTS

An audiovisual system (information processing system) for notifying a user of information regarding a recommended usage form of a wearable device (see FIG. 13A), on the basis of information relating to an external environment of the wearable device, will be described below with reference to the drawings.

Examples of usage forms of a wearable device include a video mode in which images are displayed by video see-through, an optical mode in which images are displayed by optical see-through, and a usage form as a face shield. Alternatively, examples of usage forms of a wearable device include combining one of the video mode and the optical mode with a usage form as a face shield. Usage forms of the wearable device may also include a usage form as sunglasses and so forth. That is to say, usage forms are determined by at least one of display mode (video mode or optical mode), and the form of the device (sunglasses or face shield).

Video see-through refers to displaying images obtained by superimposing virtual objects on images captured of the space to the front of the wearable device in real-time (captured images, live-view images), on a display unit. Optical see-through refers to displaying virtual objects on a part of the display unit in a state in which the external space is visually perceivable (visible) through the display unit (one-way mirror, optical system) of the wearable device. Accordingly, in the optical mode, the user can view the external space transparently through the display unit, whereas the user cannot view the external space through the display unit in the video mode.

Note that even when the display mode is the video mode, the user can visually perceive the space to the front of the wearable device by captured images. However, there is some time lag from capturing of the images to displaying of the captured images on the display unit, and accordingly the user can use the wearable device with a higher level of safety in a case of using the optical mode as the display mode, as compared to a case of using the video mode as the display mode.

Figure 13A:
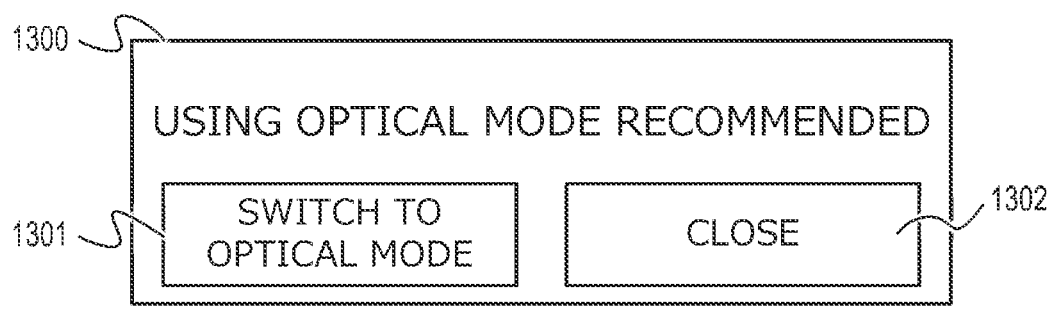
FIG. 13A is a diagram for describing recommendation information.
Figure 13B:
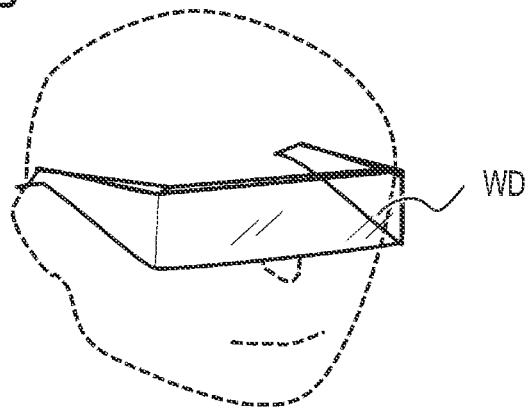
FIGS. 13B and 13C are diagrams for describing wearable devices.
Figure 13C:
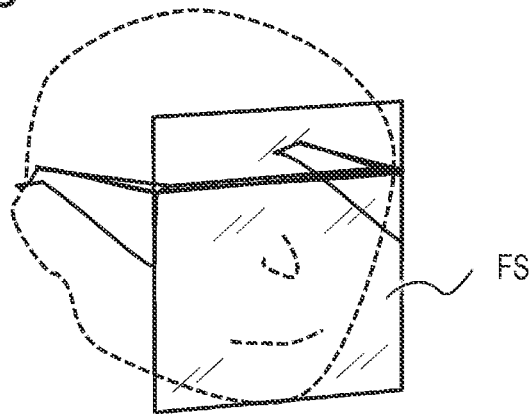

FIG. 13B illustrates an example of a wearable device WD according to the embodiments. Note that the wearable device WD may be usable as a face shield, by enabling a shield FS that covers at least around the mouth of the user to be detachably mountable to the wearable device WD, as illustrated in FIG. 13C.

Figure 14:
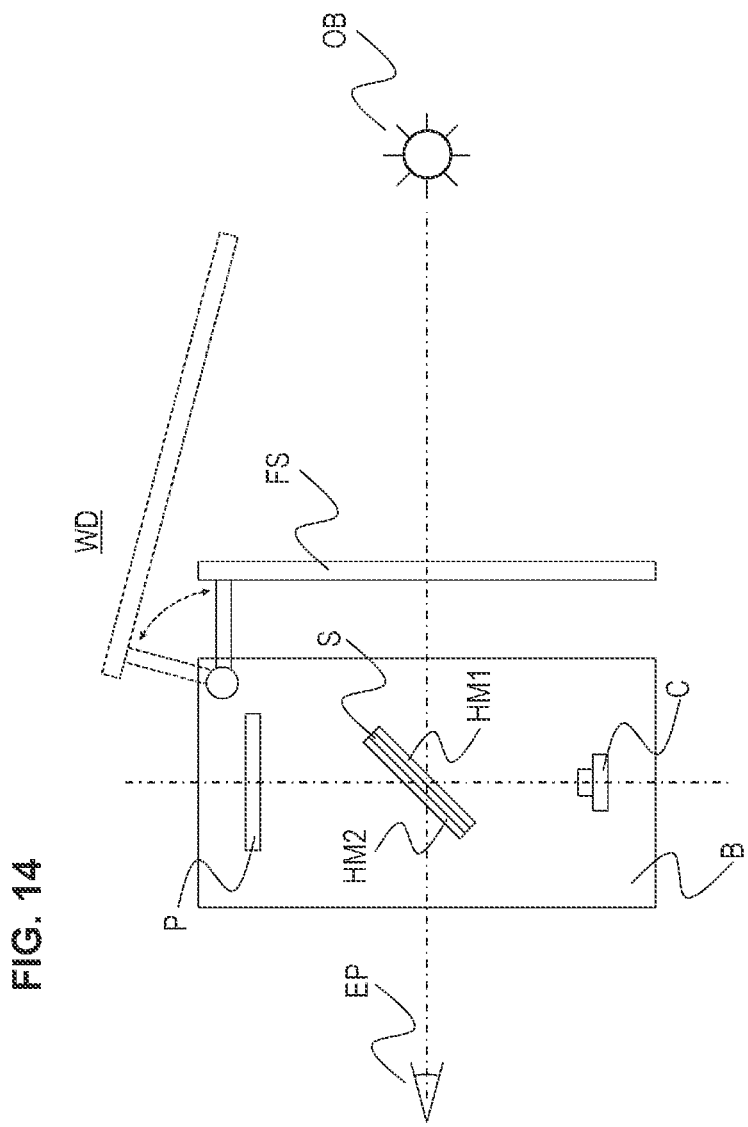
FIG. 14 is a diagram for describing a wearable device.

FIG. 14 illustrates the structure of the wearable device according to the embodiments. The wearable device WD includes a body B and the shield FS. The shield FS is vertically pivotable, either by user operations or automatically.

In a case in which video mode is set as the display mode, either by user operations or automatically, a shutter S is closed. Accordingly, the user cannot see an object OB through a one-way mirror HM1 and a one-way mirror HM2. Conversely, external light from the object OB is reflected at the one-way mirror HM1 and enters a camera C. Thereafter, images of the object OB captured by the camera C (captured images) are transmitted to a panel P, and the panel P then displays (projects) light of the captured images on the one-way mirror HM2. Thus, the light reflected at the one-way mirror HM2 (light of the captured images displayed on the one-way mirror HM2) enters eyes EP of the user. Consequently, the user can see the images representing the object OB.

In a case in which the optical mode is set as the display mode, either by user operations or automatically, the shutter S is opened. Accordingly, external light from the object OB passes through the one-way mirror HM1 and the one-way mirror HM2, enters the eyes EP of the user. Also, light of images from the panel P is reflected at the one-way mirror HM2 and enters the eyes EP of the user. Accordingly, the user can see the object OB through the one-way mirror HM1 and the one-way mirror HM2, and also can see the image displayed on the one-way mirror HM2 as well.

Figure 1:
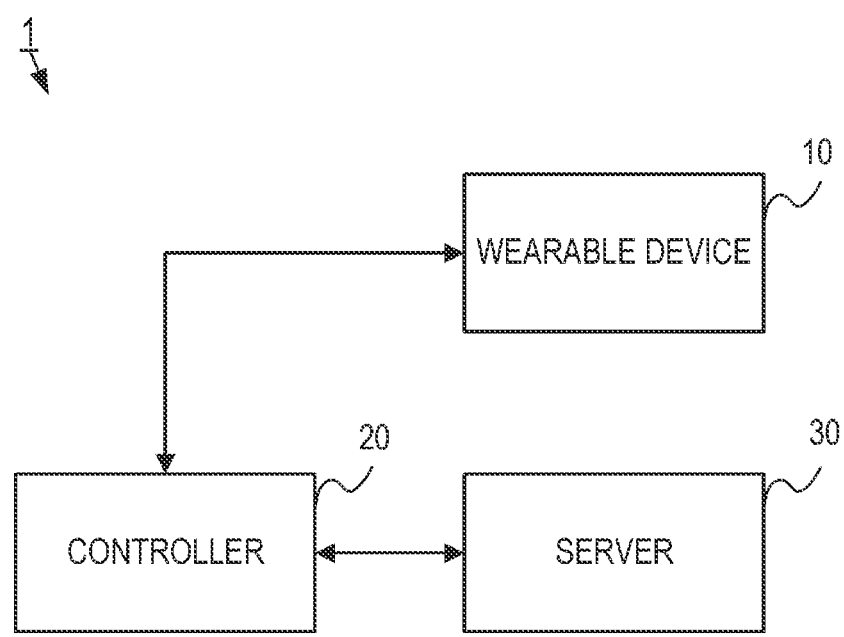
FIG. 1 is a configuration diagram of an audiovisual system according to a first embodiment.

First Embodiment (Configuration of Audiovisual System) FIG. 1 illustrates the configuration of an audiovisual system 1. The audiovisual system 1 includes a wearable device 10, a controller 20, and a server 30.

The wearable device 10 is electronic equipment that displays images on a display unit. The wearable device 10 is a head-mounted display or the like. A user can view images by mounting the wearable device 10 to his/her head. Note that in a case in which the display mode is the optical mode, the wearable device 10 can support the user by displaying additional information upon the real space.

The controller 20 is a control device (electronic equipment) for controlling the wearable device 10. The controller 20 can add additional information to the images acquired from the server 30 as necessary, and perform transmission thereof to the wearable device 10.

The server 30 accumulates images to be displayed by the wearable device 10. The server 30 transmits images to the controller 20 in response to a request from the controller 20.

Figure 2:
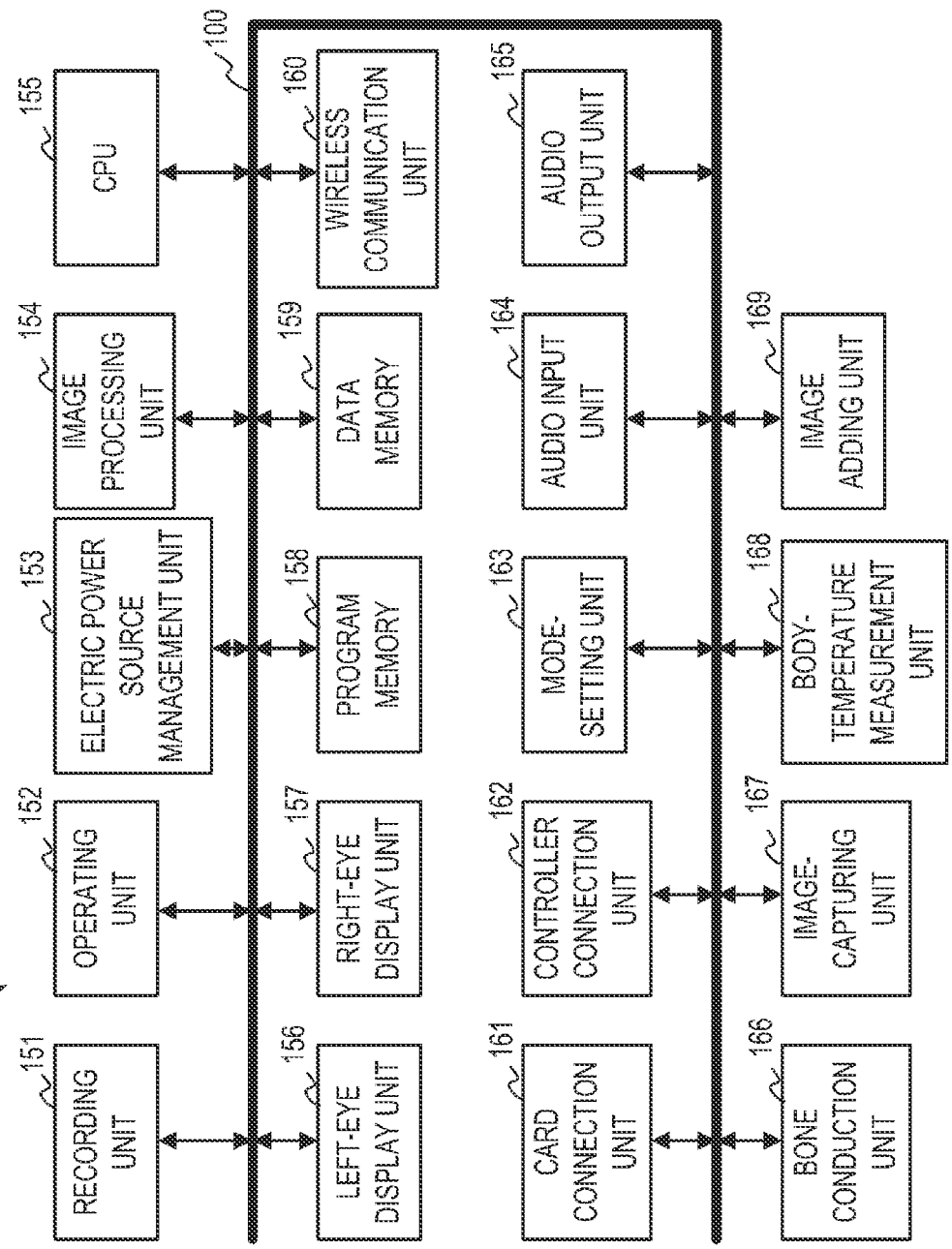
FIG. 2 is a configuration diagram of a wearable device according to the first embodiment.

(Configuration of Wearable Device) FIG. 2 illustrates a configuration of the wearable device 10. The wearable device 10 includes a recording unit 151, an operating unit 152, an electric power source management unit 153, an image processing unit 154, a central processing unit (CPU) 155, a left-eye display unit 156, a right-eye display unit 157, program memory 158, data memory 159, and a wireless communication unit 160. Also, the wearable device 10 includes a card connection unit 161, a controller connection unit 162, a mode-setting unit 163, an audio input unit 164, an audio output unit 165, a bone conduction unit 166, an image-capturing unit 167, a body-temperature measurement unit 168, and an image adding unit 169.

Note that the configurations included in the wearable device 10 can exchange information with each other via a signal line 100. Also, the controller 20 may have part of the configurations of the wearable device 10.

Captured images (moving images or still images) are stored in the recording unit 151 in a formatted manner.

The operating unit 152 accepts user operations. Examples of user operations include operations of selecting the display mode of the wearable device 10, operations of replacing a battery, operations for registering the wearable device 10 to which connection can be made, and so forth. The operating unit 152 outputs the accepted information of user operations to the CPU 155 via the signal line 100.

The electric power source management unit 153 manages the electric power source of the wearable device 10. In a state in which an electric power source switch is off, only pressing of an electric power source button is detectable by the electric power source management unit 153. Upon detecting depressing of the electric power source button in a state in which the electric power source switch is off, the electric power source management unit 153 supplies electric power to the entire wearable device 10.

Upon images (still images or moving images) that have been subjected to signal processing being input, the image processing unit 154 executes image processing on the images.

The CPU 155 executes control on the basis of control programs stored in the program memory 158.

The left-eye display unit 156 displays images to be seen by the left eye of the user. The right-eye display unit 157 displays images to be seen by the right eye of the user. By viewing images displayed on the left-eye display unit 156 with the left eye and also viewing image displayed on the right-eye display unit 157 with the right eye, the user can perceive a single image (space) with a spatial effect, for example. The left-eye display unit 156 and the right-eye display unit 157 each include the shutter S, the one-way mirrors HM1 and HM2, and the panel P illustrated in FIG. 14. Accordingly, the left-eye display unit 156 and the right-eye display unit 157 can switch whether or not to transmit light, in accordance with the display mode (video mode or optical mode).

The program memory 158 stores control programs by which the CPU 155 executes control. The data memory 159 stores information of setting conditions of the wearable device 10. The data memory 159 also stores captured images (still images or moving images), and furthermore stores attribute information (information indicating resolution and framerate) of images, and so forth.

The wireless communication unit 160 performs wireless communication in accordance with an optional wireless communication standard, such as Wi-Fi (registered trademark), Bluetooth (registered trademark), 4G, 5G, or the like.

A memory card such as a Secure Digital (SD) card or the like can be mounted to the card connection unit 161. The controller connection unit 162 is a connection unit that connects the wearable device 10 and the controller 20 by direct or wired connection.

The mode-setting unit 163 sets the display mode in accordance with user operations or in accordance with information relating to the external environment.

The audio input unit 164 is a microphone that acquires audio. The audio output unit 165 is a speaker that outputs audio by causing vibration of air. The audio output unit 165 directly outputs audio to the right and left ears of the user. The bone conduction unit 166 is an audio output unit that outputs audio (audio information) by bone conduction. The bone conduction unit 166 outputs audio by causing vibration of bones above the right and left ears of the user.

The image-capturing unit 167 acquires captured images by performing image-capturing of the space in front of the user in a case of the wearable device 10 operating in the video mode or the like. The image-capturing unit 167 is the camera C illustrated in FIG. 14 in the first embodiment. Note that the CPU 155 is capable of using captured images to perform estimation of own location and generation (creation) of a map of the environment at the same time, by simultaneous localization and mapping (SLAM) technology.

The CPU 155 can generate a map of the surrounding environment of the wearable device 10 even in an unknown environment by using SLAM technology. A map of the environment includes, for example, positions of obstructions situated in the surroundings of the wearable device 10, and the size of the surrounding space.

The body-temperature measurement unit 168 measures the body temperature of the user. The image adding unit 169 superimposes (adds) optional images to images for the optical mode, in a case of the wearable device 10 operating in the optical mode, or the like.

Figure 3:
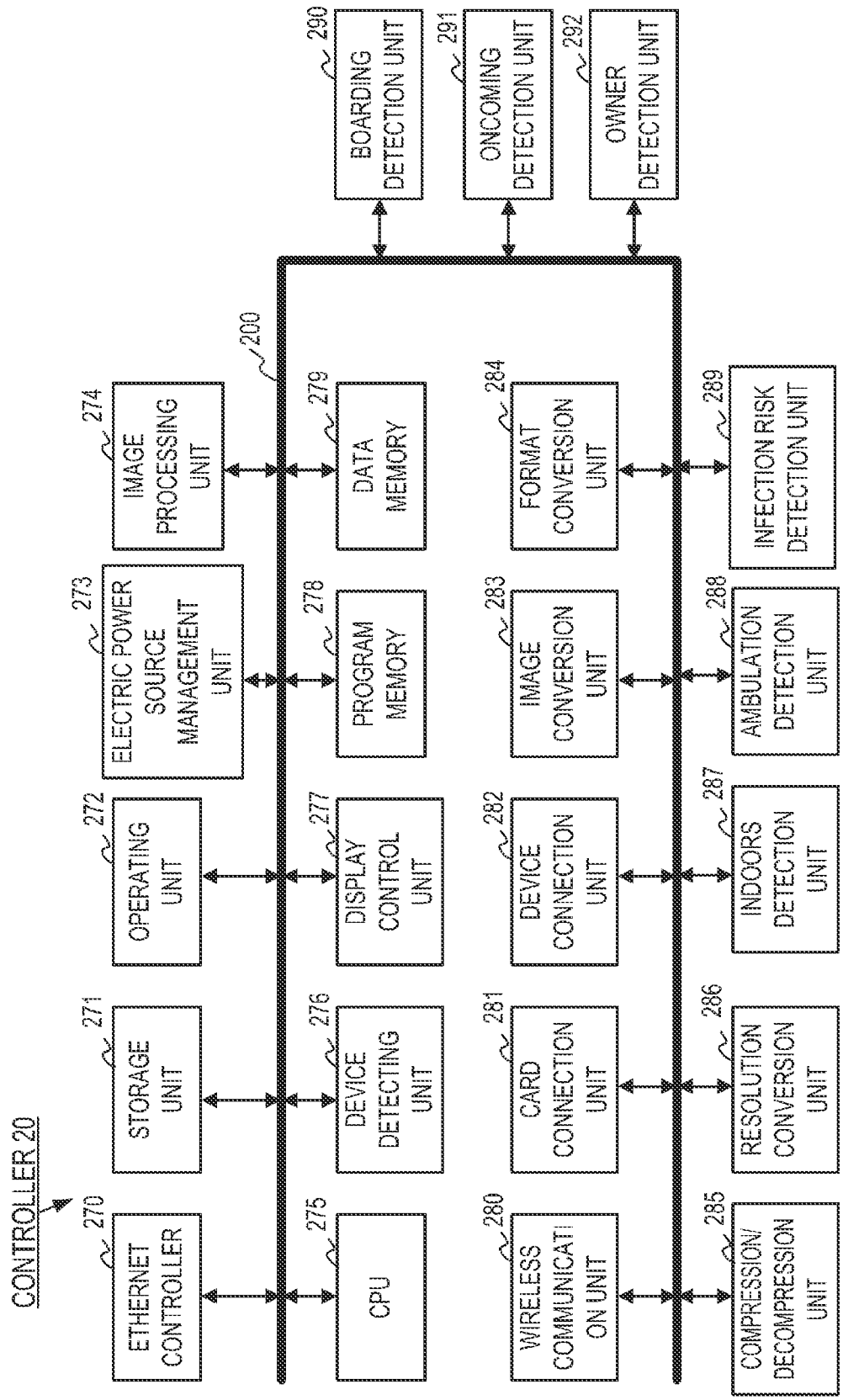
FIG. 3 is a configuration diagram of a controller according to the first embodiment.

(Configuration of Controller) FIG. 3 illustrates the configuration of the controller 20. The controller 20 controls the wearable device 10. The controller 20 includes an Ethernet controller 270, a storage unit 271, an operating unit 272, an electric power source management unit 273, an image processing unit 274, a CPU 275, a device detecting unit 276, a display control unit 277, program memory 278, and data memory 279. The controller 20 also includes a wireless communication unit 280, a card connection unit 281, a device connection unit 282, an image conversion unit 283, a format conversion unit 284, a compression/decompression unit 285, a resolution conversion unit 286, an indoors detection unit 287, and an ambulation detection unit 288. The controller 20 further includes an infection risk detection unit 289, a boarding detection unit 290, an oncoming detection unit 291, and an owner detection unit 292.

Note that the configurations included in the controller 20 can exchange information with each other via a signal line 200. Also, the wearable device 10 may have part or all of the configurations of the controller 20.

The Ethernet controller 270 determines whether or not acquired information is information regarding which the controller 20 is the transmission destination. In a case in which the acquired information is not information regarding which the controller 20 is the transmission destination, the Ethernet controller 270 discards the acquired information.

Captured images acquired by the wearable device 10 and so forth are stored in the storage unit 271 in a formatted manner. The formatted captured images are used at the time of the display control unit 277 controlling display on the wearable device 10.

The operating unit 272 accepts user operations made with respect to the controller 20.

The electric power source management unit 273 detects the state of the electric power source of the controller 20, in the same way as the electric power source management unit 153 of the wearable device 10. The image processing unit 274 performs image processing on images subjected to signal processing.

The CPU 275 executes control of the configurations on the basis of control programs stored in the program memory 278.

The device detecting unit 276 detects the wearable device 10 connected to the controller 20. The display control unit 277 controls display on the display unit (the left-eye display unit 156 and the right-eye display unit 157) of the wearable device 10 by transmitting images to the wearable device 10.

The program memory 278 stores control programs for the CPU 275 to execute control. The data memory 279 stores setting conditions of the controller 20. The data memory 279 also stores captured images, attribute information of captured images, and so forth.

The wireless communication unit 280 performs wireless communication in accordance with an optional wireless communication standard, such as Wi-Fi, Bluetooth, 4G, 5G, or the like.

A memory card such as an SD card or the like can be mounted to the card connection unit 281. The device connection unit 282 is a connection unit (joining unit) that connects the controller 20 and the wearable device 10 by direct or wired connection. The device connection unit 282 can directly connect to the controller connection unit 162 of the wearable device 10.

The image conversion unit 283 performs conversion of attributes and so forth of images. Also, the image conversion unit 283 performs conversion of images such that other configurations cannot perform.

The format conversion unit 284 converts the expression format of images that are three-dimensional video. The format conversion unit 284 converts equidistant-projection images into equirectangular-projection images, for example. The compression/decompression unit 285 compresses the size of images, and decompresses the size of compressed images. The resolution conversion unit 286 converts the resolution of input images.

The indoors detection unit 287 detects (determines) whether the controller 20 is situated indoors or outdoors. For example, the indoors detection unit 287 analyzes images captured in the surroundings of the controller 20 by SLAM technology, and thereby detects which of indoors and outdoors that the controller 20 is situated.

The ambulation detection unit 288 detects (determines) whether or not the user holding the controller 20 is performing ambulation actions. For example, the ambulation detection unit 288 acquires position information of the controller 20 by the Global Positioning System (GPS) or the like, and in a case in which the position of the controller 20 is continuously changing in a range of 2 km/h to 6 km/h, detects that the user is performing ambulation actions.

The infection risk detection unit 289 detects the current environmental situation at which the controller 20 is situated, and detects (determines) the infection risk of contagious diseases or the like. For example, the infection risk detection unit 289 determines whether or not the infection risk is high, in accordance with whether or not the concentration of people at the location where the controller 20 is currently situated is higher than a predetermined value.

The boarding detection unit 290 detects whether or not the user holding the controller 20 is on board a vehicle (a train, a bus, or the like). For example, the boarding detection unit 290 acquires position information of the controller 20 by GPS or the like, and in a case in which the position of the controller 20 is continuously changing at 10 km/h or faster, detects that the user is on board a vehicle.

The oncoming detection unit 291 detects whether or not an object is oncoming into the proximity of the controller 20 (the distance between the controller 20 and the object is decreasing to within a predetermined distance). The oncoming detection unit 291 can stop audio output from the wearable device 10 when detecting that the object is within the predetermined distance from the controller 20.

The owner detection unit 292 is an authentication unit that performs authentication of the user holding the controller 20. The owner detection unit 292 detects whether or not the user holding the wearable device 10 and the controller 20 is the owner of the wearable device 10 connected to the controller 20 who has been registered in advance.

In this way, information relating to the external environment of the controller 20 can be acquired by the indoors detection unit 287, the ambulation detection unit 288, the infection risk detection unit 289, the boarding detection unit 290, the oncoming detection unit 291, and the owner detection unit 292. The information relating to the external environment of the controller 20 is, for example, information indicating whether or not the controller 20 is being used outdoors, whether or not the user is performing ambulatory actions, whether or not the risk of infection of a contagious disease is high, whether or not an object is incoming, and so forth. Note that since the controller 20 and the wearable device 10 are held by the same user, information relating to the external environment of the controller 20 is, at the same time, information relating to the external environment of the wearable device 10.

Figure 4:
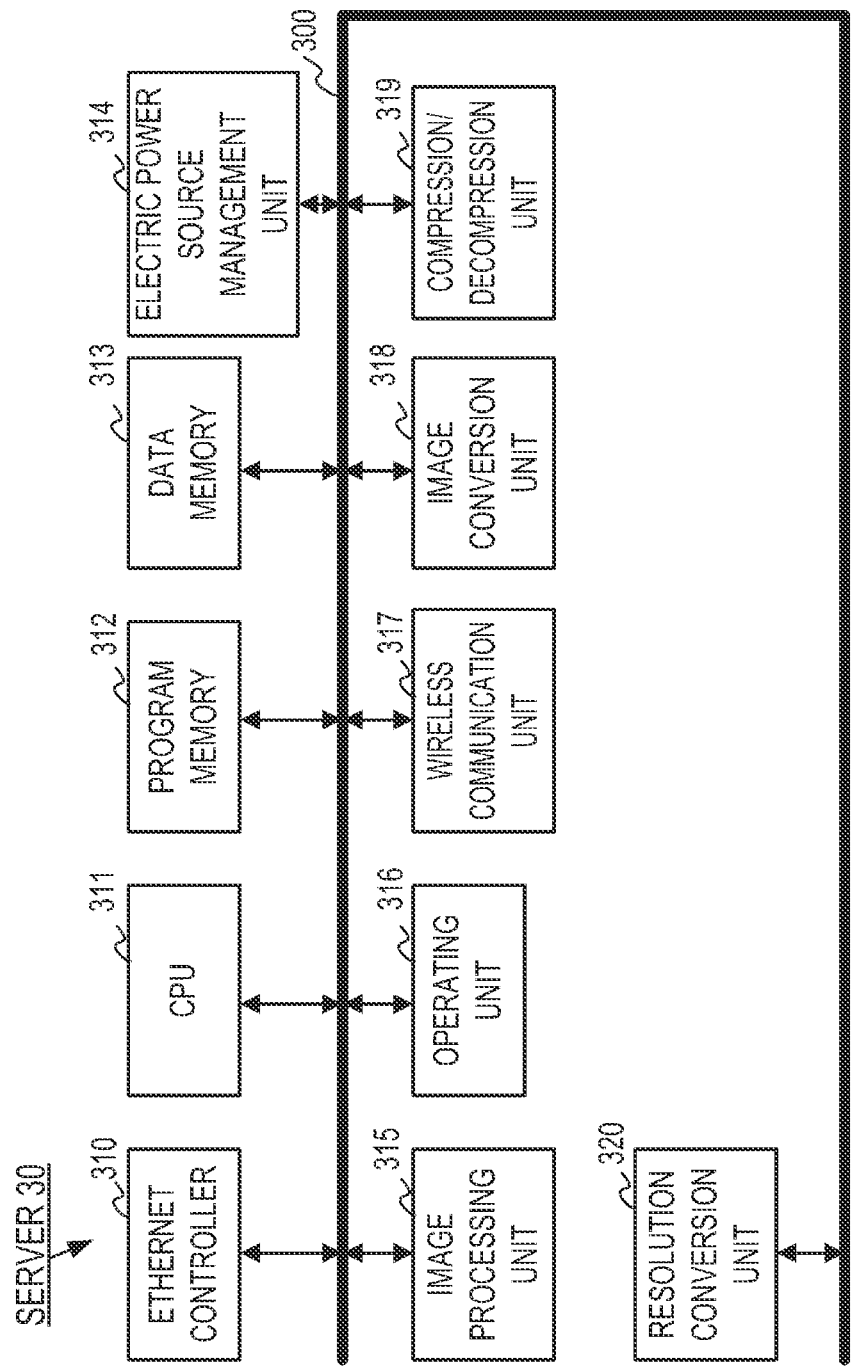
FIG. 4 is a configuration diagram of a server according to the first embodiment.

(Configuration of Server) FIG. 4 illustrates the configuration of the server 30. The server 30 includes an Ethernet controller 310, a CPU 311, program memory 312, data memory 313, an electric power source management unit 314, an image processing unit 315, and an operating unit 316. The server 30 also includes a wireless communication unit 317, an image conversion unit 318, a compression/decompression unit 319, and a resolution conversion unit 320. Note that the configurations included in the server 30 can exchange information with each other via a signal line 300.

The Ethernet controller 310 determines whether or not acquired information is information regarding which the server 30 is the transmission destination. In a case in which the acquired information is not information regarding which the server 30 is the transmission destination, the Ethernet controller 310 discards the acquired information.

The CPU 311 executes control of the configurations of the server 30 on the basis of control programs stored in the program memory 312.

The program memory 312 stores control programs for the CPU 311 to execute control. The data memory 313 stores data for settings of the server 30, images, attribute information of images, and so forth. The electric power source management unit 314 monitors the running state of the server 30 and manages the electric power source.

The image processing unit 315 performs image processing on images. The operating unit 316 generally accepts user operations via a keyboard or the like. The wireless communication unit 317 performs wireless communication in accordance with an optional wireless communication standard, such as Wi-Fi, Bluetooth, 4G, 5G, or the like.

The image conversion unit 318 performs conversion of attributes and so forth of images. Also, the image conversion unit 318 performs conversion of attributes such that other configurations cannot perform. The compression/decompression unit 319 compresses the size of images, and also decompresses the size of compressed images. The resolution conversion unit 320 converts the resolution of images.

Figure 5:
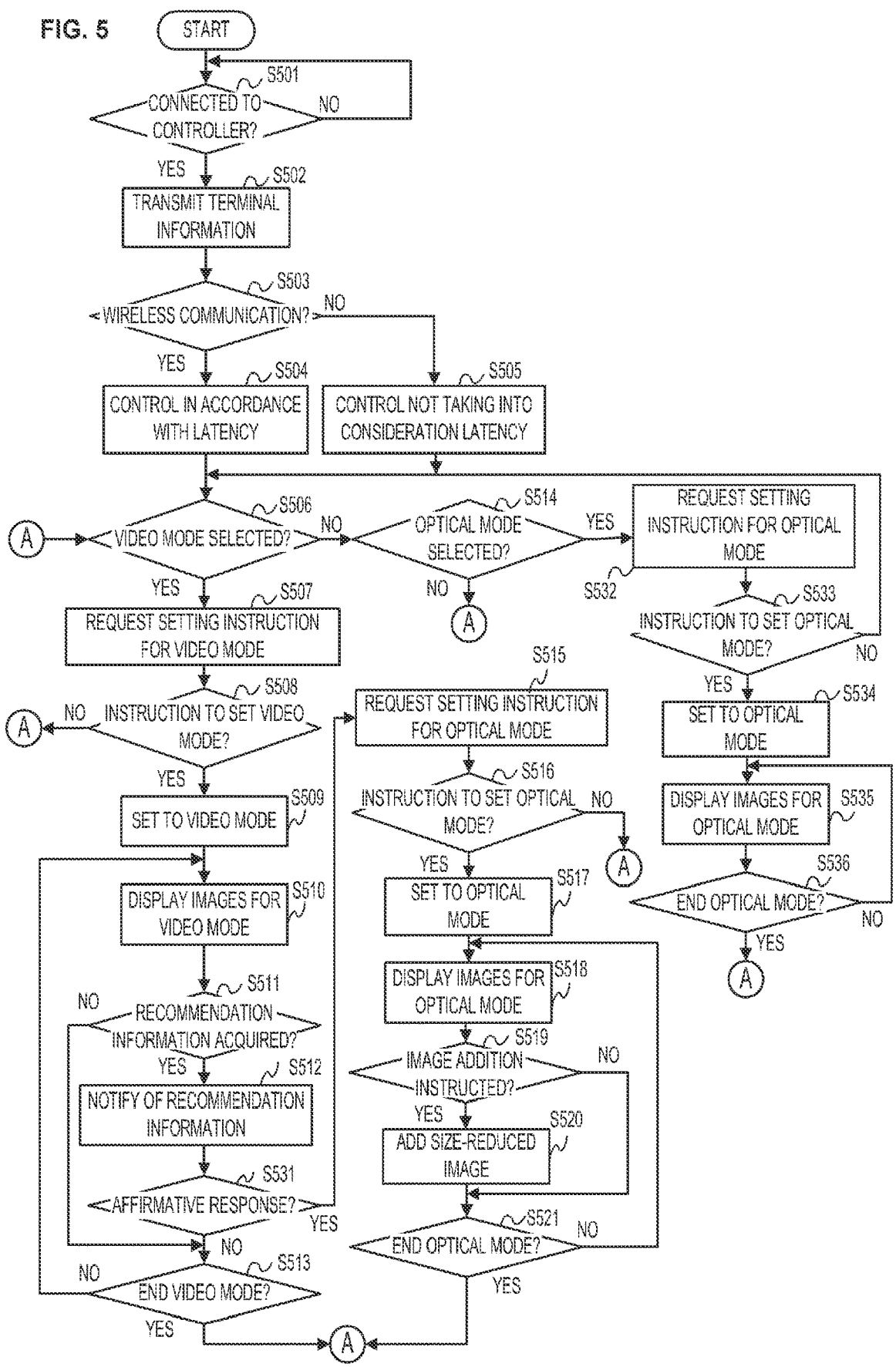
FIG. 5 is a flowchart showing processing performed at the wearable device according to the first embodiment.

(Processing Performed at the Wearable Device) Control processing (control method) of the usage form executed by the wearable device 10 will be described with reference to the flowchart shown in FIG. 5. The processing of the flowchart shown in FIG. 5 is realized by the CPU 155 executing control programs stored in the program memory 158. Also, the processing in this flowchart is started when the wearable device 10 enters an operable state, such as the electric power source of the wearable device 10 being turned on, or the like.

Note that the wearable device 10 is capable of performing other operations even during a period in which the processing of this flowchart is being performed. For example, the wearable device 10 is capable of changing the volume of audio to be output, brightness of images to be displayed, and so forth, in accordance with user operations.

In step S501, the CPU 155 determines whether or not the controller 20 is connected to the wearable device 10. Specifically, when capable of communicating with the controller 20 via the wireless communication unit 160 or the controller connection unit 162, the CPU 155 determines that the controller 20 is connected to the wearable device 10. When determination is made that the controller 20 is connected to the wearable device 10, the flow advances to step S502. When determination is made that the controller 20 is not connected to the wearable device 10, the processing of step S501 is repeated.

In step S502, the CPU 155 transmits information indicating usage forms that are selectable (usable, settable) at the wearable device 10 to the controller 20 as terminal information. That is to say, the terminal information indicates usage forms that are selectable at the wearable device 10, out of the usage forms such as video mode, optical mode, and using as a face shield, for example.

In step S503, the CPU 155 determines whether or not the wearable device 10 is performing wireless communication with (is wirelessly connected to) the controller 20. In a case in which the wireless communication unit 160 and the wireless communication unit 280 are performing wireless communication, the CPU 155 determines that the wearable device 10 and the controller 20 are performing wireless communication. In a case in which the controller connection unit 162 and the device connection unit 282 are performing communication, the CPU 155 determines that the wearable device 10 and the controller 20 are not performing wireless communication. In a case of determination being made that the wearable device 10 and the controller 20 are performing wireless communication, the flow advances to step S504. In a case of determination being made that the wearable device 10 and the controller 20 are not performing wireless communication (i.e., are performing wired communication), the flow advances to step S505.

In step S504, the CPU 155 measures the latency in wireless communication, since the wearable device 10 is performing wireless communication with the controller 20. The CPU 155 then performs settings (control) in accordance with the measured latency. Specifically, in a case of performing a request regarding which response of the controller 20 is necessary, the CPU 155 sets the maximum standby time from performing the request to acquiring a response to a time according to the latency. Note that in a case in which the maximum standby time is set, the CPU 155 performs processing of the next step at the point in time of acquiring a response or at the point in time of the maximum standby time having elapsed after making the request to the controller 20. For example, following a request for a video mode setting instruction being given in step S507, the processing of step S508 is performed at the point in time that the video mode setting instruction is received or at the point in time of the maximum standby time having elapsed. In a case in which the maximum standby time has elapsed, the CPU 155 may determine that an error has occurred and forcibly end the processing of the flowchart in FIG. 5.

In step S505, the wearable device 10 is not performing wireless communication with the controller 20, and accordingly the CPU 155 performs control that does not take latency of wireless communication into consideration. Specifically, in a case of performing a request regarding which response of the controller 20 is necessary, the CPU 155 sets the maximum standby time from making the request to acquiring the response to a relatively short time (a time shorter than the maximum standby time set in step S504) that is a predetermined time.

In step S506, determination is made by the CPU 155 regarding whether or not a user operation has been made selecting the video mode as the display mode. In a case in which determination is made that a user operation has been made selecting the video mode, the flow advances to step S507. In a case in which determination is made that a user operation has not been made selecting the video mode, the flow advances to step S514.

In step S507, the CPU 155 requests the controller 20 for an instruction (video mode setting instruction) to set the video mode as the display mode (set the display mode to the video mode).

In step S508, the CPU 155 determines whether or not an instruction has been given by the controller 20 to set the video mode as the display mode (a video mode setting instruction has been performed). In a case in which determination is made that a video mode setting instruction has been performed, the flow advances to step S509. In a case in which determination is made that a video mode setting instruction has not been performed, the flow advances to step S506.

In step S509, the CPU 155 controls the mode-setting unit 163 to set the video mode as the display mode.

In step S510, the CPU 155 displays images for the video mode that are acquired from the controller 20 on the left-eye display unit 156 and the right-eye display unit 157.

In step S511, the CPU 155 determines whether or not recommendation information has been acquired from the controller 20. Examples of recommendation information include information of recommending the optical mode as the display mode (recommending that the optical mode be used as the display mode), information recommending using a display mode that is not the video mode, and information recommending that the wearable device 10 be removed from the head. In a case in which determination is made that recommendation information has been acquired, the flow advances to step S512. In a case in which determination is made that recommendation information has not been acquired, the flow advances to step S513.

In step S512, the CPU 155 notifies the user of the recommendation information. For example, the CPU 155 superimposes an item indicating recommendation of the optical mode as the display mode on the images for video mode, which is then displayed on the left-eye display unit 156 and the right-eye display unit 157. Alternatively, the CPU 155 outputs audio indicating recommendation of the optical mode as the display mode from the audio output unit 165 or the bone conduction unit 166.

Note that the item indicating recommendation of the optical mode as the display mode is an item 1300 such as illustrated in FIG. 13A, for example. The item 1300 has a region 1301 and a region 1302. Now, a case will be assumed in which the wearable device 10 has a line-of-vision detecting unit that detects a region that the user is looking at. In this case, upon the line-of-vision detecting unit detecting that the user is continuously looking at the region 1301 for a predetermined amount of time, the CPU 155 detects that a user operation of selecting the optical mode as the display mode has been performed. Accordingly, upon the line-of-vision detecting unit detecting that the user is continuously looking at the region 1301 for a predetermined amount of time, the CPU 155 sets the optical mode as the display mode. Also, upon the line-of-vision detecting unit detecting that the user is continuously looking at the region 1302 for a predetermined amount of time, the CPU 155 hides the item 1300 from view. Also, in a case in which the recommendation information is notified by audio, upon an audio detecting unit detecting an affirmative response (a response affirming setting the optical mode as the display mode in accordance with the recommendation information), the CPU 155 sets the optical mode as the display mode.

In step S531, the CPU 155 determines whether or not an affirmative response has been detected from the user by line of sight or audio within a predetermined amount of time from notification of the recommendation information. In a case in which determination is made that an affirmative response has been detected from the user within a predetermined amount of time from notification of the recommendation information, the flow advances to step S515. In a case in which determination is made that an affirmative response has not been detected from the user within a predetermined amount of time from notification of the recommendation information, the flow advances to step S513.

In step S513, the CPU 155 determines whether or not to end operation of the wearable device 10 in the video mode (end video mode). For example, in a case of acquiring a user operation selecting a mode other than the video mode as the display mode, the CPU 155 makes a determination to end the video mode. In a case of determining to end the video mode, the flow advances to step S506. In a case of determining not to end the video mode, the flow advances to step S510.

In step S514, the CPU 155 determines whether or not a user operation has been performed to select the optical mode as the display mode. In a case in which determination is made that a user operation has been performed to select the optical mode, the flow advances to step S532. In a case in which determination is made that a user operation has not been performed to select the optical mode, the flow advances to step S506.

In step S515, the CPU 155 requests the controller 20 for an instruction (optical mode setting instruction) to set the optical mode as the display mode (set the display mode to the optical mode).

In step S516, the CPU 155 determines whether or not an instruction has been given by the controller 20 to set the optical mode as the display mode (an optical mode setting instruction has been performed). In a case in which determination is made that an optical mode setting instruction has been performed, the flow advances to step S517. In a case in which determination is made that an optical mode setting instruction has not been performed, the flow advances to step S506.

In step S517, the CPU 155 controls the mode-setting unit 163 to set the optical mode as the display mode. Accordingly, the shutters S of the left-eye display unit 156 and the right-eye display unit 157 open, and the user can see the space to the front of the wearable device 10 transparently through the images on the left-eye display unit 156 and the right-eye display unit 157.

In step S518, the CPU 155 displays images for optical mode that are acquired from the controller 20 in regions corresponding to the left-eye display unit 156 and the right-eye display unit 157.

In step S519, the CPU 155 determines whether or not image addition has been instructed by the controller 20. Image addition is to display images for optical mode, and also additionally display size-reduced images of images for the video mode in a part of the regions for the left-eye display unit 156 and the right-eye display unit 157. In a case in which determination is made that image addition has been instructed, the flow advances to step S520. In a case in which determination is made that image addition has not been instructed, the flow advances to step S521.

In step S520, the CPU 155 controls the image adding unit 169 to display images for optical mode, and also to display size-reduced images of images for the video mode, received from the controller 20, in a part of the regions for the left-eye display unit 156 and the right-eye display unit 157. Accordingly, the user can directly confirm the situation of the surroundings thereof (external space) by eye in the optical mode, while confirming the images which were being viewed in the video mode.

In step S521, the CPU 155 determines whether or not to end operation of the wearable device 10 in the optical mode (to end the optical mode). For example, in a case in which a user operation to select a mode other than the optical mode for the display mode is acquired, the CPU 155 makes determination to end the optical mode. In a case in which determination is made to end the optical mode, the flow advances to step S506. In a case in which determination is not made to end the optical mode, the flow advances to step S518.

In step S532, the CPU 155 requests the controller 20 for an instruction (optical mode setting instruction) to set the optical mode as the display mode (set the display mode to the optical mode).

In step S533, the CPU 155 determines whether or not an instruction has been given by the controller 20 to set the optical mode as the display mode (an optical mode setting instruction has been performed). In a case in which determination is made that an optical mode setting instruction has been performed, the flow advances to step S534. In a case in which determination is made that an optical mode setting instruction has not been performed, the flow advances to step S506.

In step S534, the CPU 155 controls the mode-setting unit 163 to set the optical mode as the display mode. Accordingly, the shutters S of the left-eye display unit 156 and the right-eye display unit 157 open, and thus the user can see the space to the front of the wearable device 10 through the images on the left-eye display unit 156 and the right-eye display unit 157.

In step S535, the CPU 155 displays images for the optical mode that are acquired from the controller 20 in regions corresponding to the left-eye display unit 156 and the right-eye display unit 157.

In step S536, the CPU 155 determines whether or not to end operation of the wearable device 10 in the optical mode (to end the optical mode). For example, in a case in which a user operation to select a mode other than the optical mode for the display mode is acquired, the CPU 155 makes determination to end the optical mode. In a case in which determination is made to end the optical mode, the flow advances to step S506. In a case in which determination is not made to end the optical mode, the flow advances to step S535.

Figure 6:
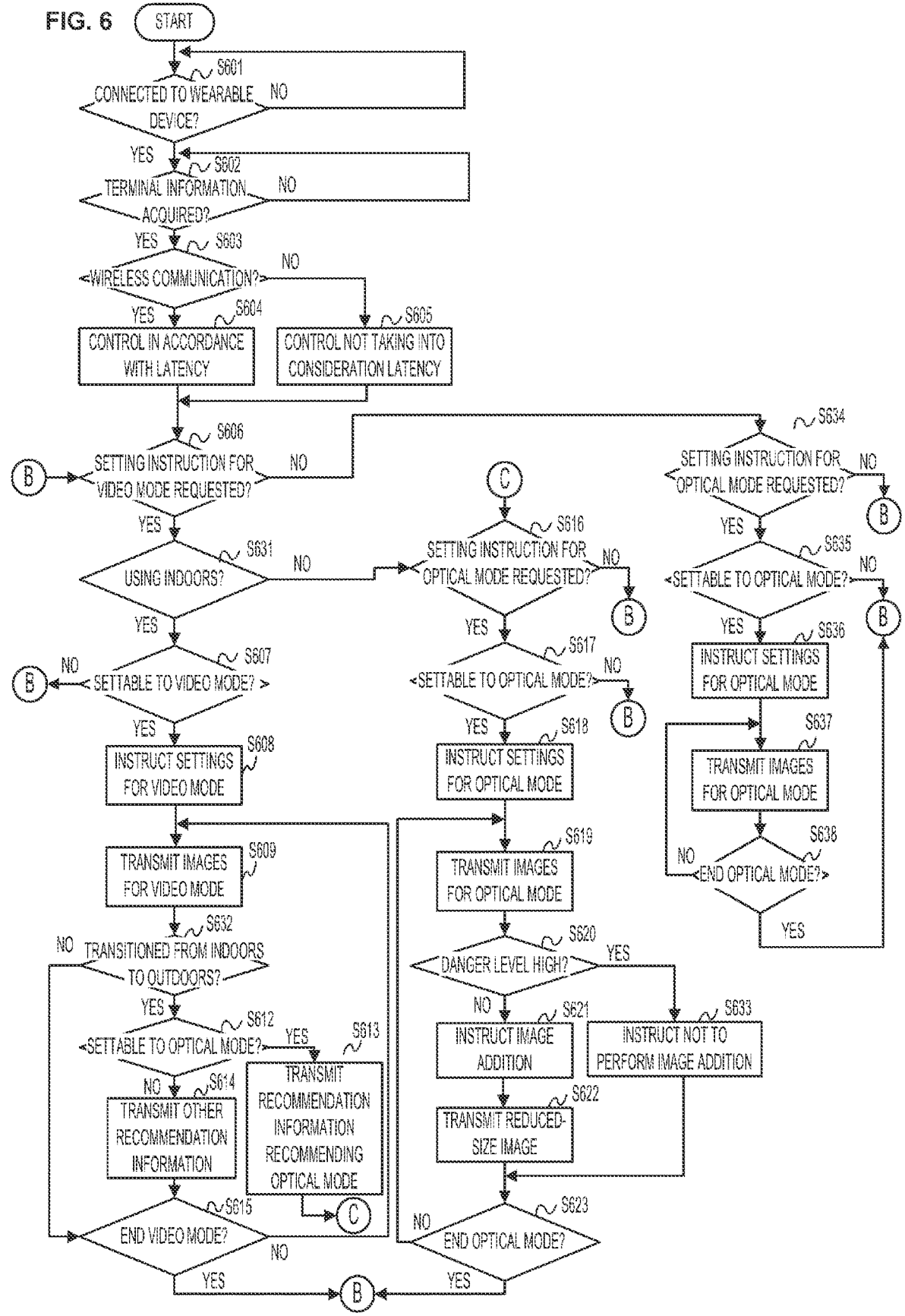
FIG. 6 is a flowchart showing processing performed at the controller according to the first embodiment.

(Processing Performed at Controller) Control processing (control method) of the usage form executed by the controller 20 will be described with reference to the flowchart shown in FIG. 6. The processing of the flowchart shown in FIG. 6 is realized by the CPU 275 executing control programs stored in the program memory 278. Also, the processing in this flowchart is started when the controller 20 enters an operable state, such as the electric power source of the controller 20 being turned on, or the like.

Note that the controller 20 is capable of performing other operations even while the processing of this flowchart is being performed. For example, the controller 20 is capable of changing the format of wireless communication performed by the wireless communication unit 280, and so forth, in accordance with user operations.

In step S601, the CPU 275 determines whether or not the wearable device 10 is connected to the controller 20. Specifically, when capable of communicating with the wearable device 10 via the wireless communication unit 280 or the device connection unit 282, the CPU 275 determines that the wearable device 10 is connected to the controller 20. When determination is made that the wearable device 10 is connected to the controller 20, the flow advances to step S602. When determination is made that the wearable device 10 is not connected to the controller 20, the processing of step S601 is repeated.

In step S602, the CPU 275 determines whether or not the terminal information has been acquired from the wearable device 10. In a case in which determination is made that the terminal information has been acquired, the flow advances to step S603. In a case in which determination is made that the terminal information has not been acquired, the processing of step S602 is repeated. The terminal information indicates usage forms that are selectable at the wearable device 10, out of usage forms such as the video mode, the optical mode, and using as a face shield, for example.

In step S603, the CPU 275 determines whether or not the controller 20 is performing wireless communication with (is wirelessly connected to) the wearable device 10. In a case in which the wireless communication unit 280 and the wireless communication unit 160 are performing wireless communication, the CPU 275 determines that the controller 20 and the wearable device 10 are performing wireless communication. In a case in which the device connection unit 282 and the controller connection unit 162 are performing communication, the CPU 275 determines that the controller 20 and the wearable device 10 are not performing wireless communication. In a case of determination being made that the controller 20 and the wearable device 10 are performing wireless communication, the flow advances to step S604. In a case of determination being made that the controller 20 and the wearable device 10 are not performing wireless communication (i.e., performing wired communication), the flow advances to step S605.

In step S604, the CPU 275 measures the latency in wireless communication, since the controller 20 is performing wireless communication with the wearable device 10. The CPU 275 then performs control in accordance with the measured latency, in the same way as with step S504.

In step S605, the controller 20 is not performing wireless communication with the wearable device 10, and accordingly the CPU 275 performs control that does not take latency of wireless communication into consideration, in the same way as with step S505.

In step S606, the CPU 275 determines whether or not an instruction to set the video mode as the display mode (video mode setting instruction) has been requested from the wearable device 10. In a case in which determination is made that a video mode setting instruction has been requested, the flow advances to step S631. In a case in which determination is made that a video mode setting instruction has not been requested, the flow advances to step S634.

In step S631, the CPU 275 controls the indoors detection unit 287 and determines whether or not the wearable device 10 (or the controller 20) is being used indoors. In a case in which determination is made that the wearable device 10 is being used indoors, the flow advances to step S607. In a case in which determination is made that the wearable device 10 is not being used indoors, the flow advances to step S616.

In step S607, the CPU 275 determines whether or not the video mode is settable as the display mode of the wearable device 10, on the basis of the terminal information acquired in step S602. In a case in which determination is made the video mode is settable as the display mode, the flow advances to step S608. In a case in which determination is made the video mode is not settable as the display mode, the flow advances to step S606.

In step S608, the CPU 275 instructs the wearable device 10 to set the video mode as the display mode.

In step S609, the CPU 275 transmits images for the video mode as images for the wearable device 10 to display in video mode. Images for the video mode are, for example, images obtained by superimposing an image of a virtual object stored in the data memory 279 or an image of a virtual object accumulated in the server 30 upon images acquired by the image-capturing unit 167 performing image-capturing in real-time (live-view images). Images for the video mode are generated by the image processing unit 274.

In step S632, the CPU 275 controls the indoors detection unit 287 to determine whether the wearable device 10 (or the controller 20) has transitioned from a state of being used indoors to a state of being used outdoors. In a case in which determination is made that the wearable device 10 has transitioned to a state of being used outdoors, the flow advances to step S612. In a case in which determination is made that the wearable device 10 has not transitioned to a state of being used outdoors, the flow advances to step S615.

In step S612, the CPU 275 determines whether or not the optical mode is settable as the display mode of the wearable device 10, on the basis of the terminal information acquired in step S602. In a case in which determination is made the optical mode is settable as the display mode of the wearable device 10, the flow advances to step S613. In a case in which determination is made the optical mode is not settable as the display mode of the wearable device 10, the flow advances to step S614.

In step S613, the CPU 275 transmits recommendation information to the wearable device 10, recommending the optical mode as the display mode. That is to say, in a case in which the wearable device 10 has transitioned to a state of being used outdoors, or in a case of having transitioned to a state of being used by a user performing ambulation actions, the CPU 275 determines to recommend the optical mode as the display mode if the optical mode is settable as the display mode. The CPU 275 then controls the wearable device 10 to notify the user of the recommendation information, by transmitting the recommendation information recommending the optical mode as the display mode to the wearable device 10. Upon the processing of step S613 ending, the flow advances to the processing of step S616.

In step S614, the CPU 275 transmits recommendation information recommending switching the display mode from the video mode, recommendation information recommending removing the wearable device 10 from the head, or the like, to the wearable device 10.

Thus, according to steps S632 and S612 to S614, when the wearable device 10 (or the controller 20) transitions from indoor use to outdoor use, the controller 20 notifies the wearable device 10 of recommendation information. Recommendation information is recommendation information recommending the optical mode as the display mode, or recommendation information recommending switching the display mode from the video mode to the optical mode. Accordingly, in a case in which the necessity for the user to directly visually perceive the external space is high, the wearable device 10 can notify the user to end the video mode in which the user cannot directly visually perceive the external space.

In step S615, the CPU 275 determines whether or not operations of the wearable device 10 in the video mode have ended (the video mode has ended). For example, in a case in which acquisition of user operations selecting a mode other than the video mode as the display mode has been notified from the wearable device 10, the CPU 275 determines that the video mode has ended. In a case in which determination is made that the video mode has ended, the flow advances to step S606. In a case in which determination is made that the video mode has not ended, the flow advances to step S609.

In step S616, the CPU 275 determines whether or not an instruction to set the optical mode as the display mode (an optical mode setting instruction) has been requested from the wearable device 10. In a case in which determination is made that an optical mode setting instruction has been requested, the flow advances to step S617. In a case in which determination is made that an optical mode setting instruction has not been requested, the flow advances to step S606.

In step S617, the CPU 275 determines whether or not the optical mode is settable as the display mode of the wearable device 10, on the basis of the terminal information acquired in step S602. In a case in which determination is made the optical mode is settable as the display mode, the flow advances to step S618. In a case in which determination is made the optical mode is not settable as the display mode, the flow advances to step S606.

In step S618, the CPU 275 instructs the wearable device 10 to set the optical mode as the display mode.

In step S619, the CPU 275 transmits images for the optical mode as images for the wearable device 10 to display in the optical mode. Images for the optical mode are, for example, an image of a virtual object stored in the data memory 279 or an image of a virtual object accumulated in the server 30. Generally, the CPU 275 transmits additional information to deepen the understanding of images being viewed in the optical mode.

In step S620, the CPU 275 determines whether or not a danger level of the environment (surrounding environment) surrounding the wearable device 10 (or the controller 20) is high, on the basis of information relating to the external environment. For example, in a case of detecting a road on which many vehicles are traveling, or a road where the sidewalk and the roadway are not clearly separated, in the surroundings of the wearable device 10 (or the controller 20), the CPU 275 determines that the danger level of the surrounding environment is high. Also, in a case in which the sound level of the external environment surrounding the wearable device 10 is higher than a predetermined value, the CPU 275 determines that the danger level of the surrounding environment is high. Conversely, in a case in which the user is performing ambulation actions on the sidewalk of a wide road (general road), for example, the CPU 275 determines that the danger level of the surrounding environment is not high. In a case in which determination is made that the danger level of the surrounding environment is high, the flow advances to step S633. In a case in which determination is made that the danger level of the surrounding environment is not high, the flow advances to step S621.

In step S621, the CPU 275 instructs the wearable device 10 to perform image addition.

In step S622, the CPU 275 transmits size-reduced images of images for the video mode to the wearable device 10. The images for the video mode here are the same as the images transmitted to the wearable device 10 in step S609.

Thus, in step S620 to S622, in a case in which the danger level of the surrounding environment is not high, the controller 20 displays images in which the size of images that can be viewed in the video mode is reduced, on the wearable device 10 in the optical mode as well. Accordingly, the user can continue to view the images that were displayed and being viewed in the video mode before the display mode was switched to the optical mode, for example. Thus, convenience is improved for the user of the wearable device 10.

In step S633, the CPU 275 instructs the wearable device 10 not to perform image addition. That is to say, in a case in which the danger level of the surrounding environment is high, the controller 20 does not display images in which the size of images that can be viewed in the video mode is reduced on the wearable device 10 that is in the optical mode. Accordingly, the user can readily be attentive of the surrounding atmosphere, and thus can use the wearable device 10 safely.

In this way, according to the first embodiment, display/non-display of size-reduced images is switched in accordance with the height of the danger level of the surrounding environment (information of external environment). However, an arrangement may be made in which, upon the processing of step S619 ending, the processing of step S621 is started without the determination of step S620 being performed. That is to say, the size-reduced images of images for video mode may be displayed on the wearable device 10 in all cases in which the wearable device 10 is operating in the optical mode.

In step S623, the CPU 275 determines whether or not operations of the wearable device 10 in the optical mode have ended (the optical mode has ended). For example, in a case in which acquisition of user operations selecting a mode other than the optical mode as the display mode has been notified from the wearable device 10, the CPU 275 determines that the optical mode has ended. In a case in which determination is made that the optical mode has ended, the flow advances to step S606. In a case in which determination is made that the optical mode has not ended, the flow advances to step S619.

In step S634, the CPU 275 determines whether or not an instruction to set the optical mode as the display mode (an optical mode setting instruction) has been requested from the wearable device 10. In a case in which determination is made that an optical mode setting instruction has been requested, the flow advances to step S635. In a case in which determination is made that an optical mode setting instruction has not been requested, the flow advances to step S606.

In step S635, the CPU 275 determines whether or not the optical mode is settable as the display mode of the wearable device 10, on the basis of the terminal information acquired in step S602. In a case in which determination is made that the optical mode is settable as the display mode, the flow advances to step S636. In a case in which determination is made that the optical mode is not settable as the display mode, the flow advances to step S606.

In step S636, the CPU 275 instructs the wearable device 10 to set the optical mode as the display mode.

In step S637, the CPU 275 transmits images for the optical mode as images for the wearable device 10 to display in the optical mode. Images for the optical mode are, for example, an image of a virtual object stored in the data memory 279 or an image of a virtual object accumulated in the server 30. Generally, the CPU 275 transmits additional information to deepen the understanding of images being viewed in the optical mode.

In step S638, the CPU 275 determines whether or not operations of the wearable device 10 in the optical mode have ended (the optical mode has ended). For example, in a case in which acquisition of user operations selecting a mode other than the optical mode as the display mode has been notified from the wearable device 10, the CPU 275 determines that the optical mode has ended. In a case in which determination is made that the optical mode has ended, the flow advances to step S606. In a case in which determination is made that the optical mode has not ended, the flow advances to step S637.

(Processing Performed at Server) Processing of accumulating and transmitting images executed by the server 30 will be described with reference to the flowchart shown in FIG. 7. The processing of the flowchart shown in FIG. 7 is realized by the CPU 311 executing control programs stored in the program memory 312. Also, the processing in this flowchart is started when the server 30 enters an operable state, such as the electric power source of the server 30 being turned on, or the like.

In step S701, the CPU 311 determines whether or not an image has been acquired from equipment (external equipment) that is neither the controller 20 nor the wearable device 10. In a case in which determination is made that an image has been acquired from external equipment, the flow advances to step S702. In a case in which determination is made that an image has not been acquired from external equipment, the flow advances to step S703.

In step S702, the CPU 311 stores (accumulates) the image acquired in step S701 in the data memory 313.

In step S703, the CPU 311 determines whether or not an image has been acquired from the controller 20. In a case in which determination is made that an image has been acquired from the controller 20, the flow proceeds to step S704. In a case in which determination is made that an image has not been acquired from the controller 20, the flow proceeds to step S705.

In step S704, the CPU 311 stores the image acquired in step S703 in the data memory 313.

In step S705, the CPU 311 determines whether or not a request has been performed by the controller 20 to transmit an image for display on the wearable device 10. In a case in which determination is made that a request has been performed by the controller 20 for transmission of an image, the flow advances to step S706. In a case in which determination is made that a request has not been performed by the controller 20 for transmission of an image, the flow advances to step S701.

In step S706, the CPU 311 transmits an image to the controller 20 for display on the wearable device 10.

According to steps S705 and S706, the controller 20 can acquire an image from the server 30 for display on the wearable device 10 at an optional timing.

Thus, according to the first embodiment, the audiovisual system 1 determines a recommended usage form of the wearable device 10 on the basis of information relating to the external environment, and notifies the user of information of the recommended usage form. Specifically, in a case in which the wearable device 10 transitions to a state of being used outdoors in a state in which the wearable device 10 is being used in the video mode, the controller 20 determines to recommend the optical mode. The controller 20 then transmits recommendation information recommending the optical mode to the wearable device 10, and causes the wearable device 10 to notify the user of the recommendation information.

According to this, in a case in which there is danger due to viewing images in the video mode, the user can be made to comprehend that he/she should switch to the optical mode where images can be viewed more safely. Thus, the user can more readily comprehend the timing to switch the usage form of a wearable device that can be used in a plurality of usage forms. For example, when leaving a room to go outdoors, the external space is not visible to the user. This may lead to the user being injured outdoors. However, upon receiving a notification of recommendation information recommending using the optical mode as the display mode from the wearable device 10, as in the first embodiment, the user can immediately change the settings of the display mode to the optical mode. Hence, the chance of the user being injured outdoors is suppressed, and safety of the user can be ensured.

Note that in a case of notifying the user of recommendation information recommending using the optical mode as the display mode, and a predetermined amount of time elapses from the notification of recommendation information, the wearable device 10 may further set the optical mode as the display mode (may switch to the optical mode). That is to say, after going through the processing of step S512, and standing by for a predetermined amount of time, the flow may advance to step S515 without going through step S531. That is to say, the display mode may be switched without awaiting an affirmative response following a predetermined amount of time, two seconds for example, elapsing after displaying the recommendation information. Also, in a case in which determination is made that a user operation has been made selecting the optical mode in step S514, the flow may advance to step S515. In a case in which determination is made in step S606 that a setting instruction for the video mode is not requested, the flow may advance to step S616.

Also, instead of the video mode, an optional usage form may be used in which the user cannot see the outside through the left-eye display unit 156 and the right-eye display unit 157. For example, instead of the video mode, a mode in which an optional image (an image representing a virtual reality (VR) space) is displayed on the left-eye display unit 156 and the right-eye display unit 157 may be used. Also, instead of the optical mode, a usage form may be used in which no images are displayed on the left-eye display unit 156 and the right-eye display unit 157 whatsoever, as long as the user is able to directly see the external space.

Second Embodiment

The audiovisual system 1 in which, in a case of a user displaying images in the video mode indoors going outdoors, displaying images in the optical mode is recommended, has been described in the first embodiment. In the second embodiment, the audiovisual system 1 in which, in a case of a user in a stationary state displaying images in the video mode, and then transitioning to ambulation actions, displaying images in the optical mode is recommended, will be described. Note that a stationary state is an optional state in which ambulation actions (changing locations) is not being performed.

(Processing Performed at Controller) Control processing of usage forms executed by the controller 20 will be described with reference to flowcharts shown in FIGS. 8A and 8B. The processing of the flowcharts shown in FIGS. 8A and 8B is realized by the CPU 275 executing control programs stored in the program memory 278.

In the second embodiment, instead of "Determination of whether or not wearable device 10 is being used indoors" (processing of step S631) in the first embodiment, "Determination of whether or not user is walking" (processing of step S801) is performed. Also, instead of "Determination of whether or not transitioned from indoor use of wearable device 10 to outdoor use" (processing of step S632), "Determination of whether or not user transitioned from stationary state to ambulation actions" (processing of step S802) is performed.

Figure 8A:
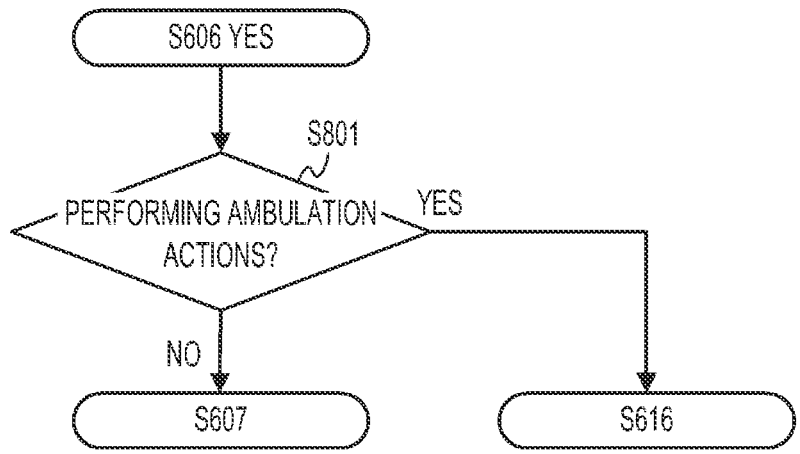
FIGS. 8A and 8B are flowcharts showing processing according to a second embodiment.
Figure 8B:
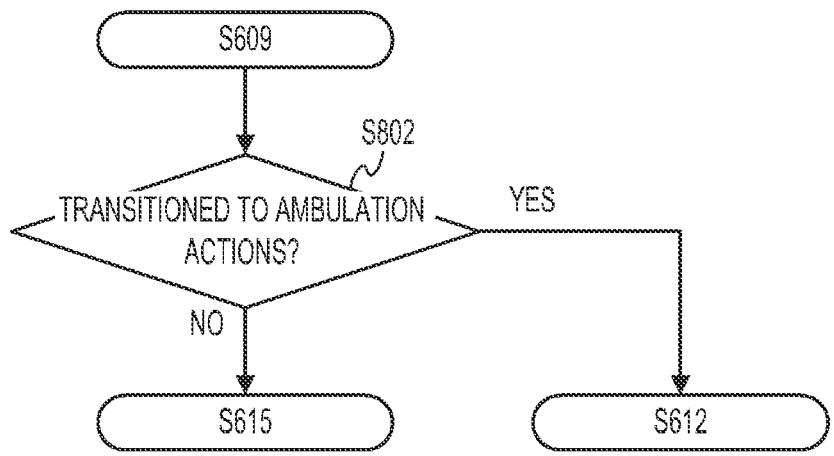

The processing of FIG. 8A is started in a case of YES in step S606 in the flowchart shown in FIG. 6 (a case in which determination is made that a setting instruction for the video mode has been requested).

In step S801, the CPU 275 controls the ambulation detection unit 288 to determine whether or not the wearable device 10 (or the controller 20) is being used while the user is performing ambulation actions. In a case in which determination is made that the wearable device 10 is being used while the user is performing ambulation actions, the flow advances to step S616. In a case in which determination is made that the wearable device 10 is not being used while the user is performing ambulation actions, the flow advances to step S607.

The processing of FIG. 8B is started in a case of the processing of step S609 (processing for transmitting a video mode image) ending in the flowchart shown in FIG. 6.

In step S802, the CPU 275 controls the ambulation detection unit 288 to determine whether or not the user of the wearable device 10 (or the controller 20) is transitioning from a stationary state to ambulation actions. In a case in which determination is made that the user is transitioning from a stationary state to ambulation actions, the flow advances to step S612. In a case in which determination is made that the user is not transitioning from a stationary state to ambulation actions, the flow advances to step S615.

Thus, according to the second embodiment, the audiovisual system 1 determines a recommended usage form of the wearable device 10 on the basis of information relating to the external environment, and notifies the user of the information of the recommended usage form. Specifically, in a case in which the user is using the wearable device 10 in the video mode, and the user using the wearable device 10 transitions to ambulation actions, the controller 20 determines to recommend the optical mode. The controller 20 then transmits recommendation information recommending use of the optical mode to the wearable device 10, and causes the wearable device 10 to notify the user of the recommendation information.

According to this, in a case in which there is danger due to viewing images in the video mode, the user can be made to comprehend that he/she should switch to the optical mode where images can be viewed more safely. Thus, the user can more readily comprehend the timing to switch the usage form of a wearable device that can be used in a plurality of usage forms. For example, in a case in which the user is viewing images in the video mode indoors, and performs ambulation actions to descend a flight of stairs, the external space is not visible to the user. This may lead to the user missing his/her step on the stairs. However, upon receiving a notification of recommendation information recommending using the optical mode as the display mode from the wearable device 10, as in the second embodiment, the user can immediately change the settings of the display mode to the optical mode. Hence, the chance of the user missing his/her step on the stairs is suppressed, and safety of the user can be ensured.

Note that in a case of notifying the user of recommendation information recommending using the optical mode as the display mode, and a predetermined amount of time elapses from the notification of recommendation information, the wearable device 10 may further set the optical mode as the display mode (may switch to the optical mode). That is to say, after going through the processing of step S512, and following standing by for a predetermined amount of time, the flow may advance to step S515.

Also, instead of the video mode, an optional usage form may be used in which the user cannot see the outside through the left-eye display unit 156 and the right-eye display unit 157. For example, instead of the video mode, a mode in which an optional image (an image representing a VR space) is displayed on the left-eye display unit 156 and the right-eye display unit 157 may be used. Also, instead of the optical mode, a usage form may be used in which no images are displayed on the left-eye display unit 156 and the right-eye display unit 157 whatsoever, as long as the user is able to directly see the external space.

The audiovisual system 1 may combine the first and second embodiments, and switch to display in the optical mode in a case in which a user, who is stationary indoors and is using the wearable device 10 operating in the video mode, moves to the outdoors or transitions to performing ambulation actions.

Further, in a case in which the user is outdoors or the user is performing ambulation actions, and the video mode is selected as the display mode, the audiovisual system 1 may display images in the optical mode from the beginning, without performing display of images in the video mode whatsoever.

Third Embodiment

In a third embodiment, the audiovisual system 1 in which using the wearable device 10 as a face shield is recommended will be further described. Note that in a case of using the wearable device 10 as a face shield, the wearable device 10 may display images on the left-eye display unit 156 and the right-eye display unit 157, or may display images on the shield FS (see FIG. 14). In a case in which images are displayed on the shield FS, images may be displayed on the shield FS by light projected from a small-sized projector. Alternatively, in a case in which the shield FS is a light-emitting curved-screen display, images may be displayed by light emitted thereby.

(Processing Performed at Wearable Device) In the third embodiment, the processing of the flowchart shown in FIG. 9A is further executed in the control processing of usage form that wearable device 10 executes, shown in FIG. 5. Specifically, the processing of the flowchart shown in FIG. 9A is executed between step S535 and step S536.

Upon the processing of step S535 ending, in step S901, the CPU 155 determines whether or not recommendation information recommending the face shield as a usage form (recommending usage of the face shield) has been acquired from the controller 20. In a case in which determination is made that recommendation information recommending the face shield has been acquired, the flow advances to step S902. In a case in which determination is made that recommendation information recommending the face shield has not been acquired, the flow advances to step S536.

In step S902, the CPU 155 determines whether or not the user is currently using the wearable device 10 as a face shield. The CPU 155 determines whether or not the user is using the wearable device 10 as a face shield, in accordance with whether or not the shield FS is mounted to the wearable device 10, for example. In a case in which determination is made that the user is using the wearable device 10 as a face shield, the flow advances to step S536. In a case in which determination is made that the user is not using the wearable device 10 as a face shield, the flow advances to step S903.

In step S903, the CPU 155 notifies the user of recommendation information recommending the face shield as the usage form. For example, the CPU 155 displays an item indicating recommendation of the face shield as the usage form on the left-eye display unit 156 and the right-eye display unit 157.

Figure 9B:
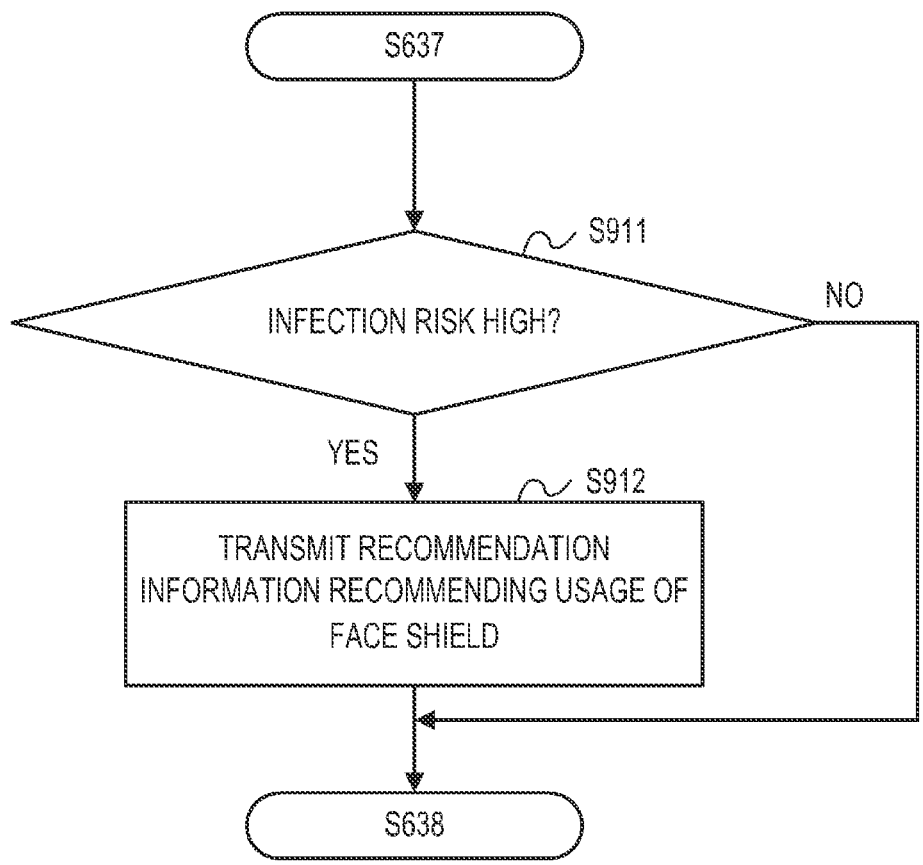

(Processing Performed at the Controller) Also, in the third embodiment, the processing of the flowchart shown in FIG. 9B is further executed in the control processing of usage form shown in FIG. 6 that the controller 20 executes. Specifically, the processing of the flowchart shown in FIG. 9B is executed between step S637 and step S638.

Upon the processing of step S637 ending, in step S911 the CPU 275 controls the infection risk detection unit 289 to determine whether or not an infection risk of a contagious disease in the surroundings of the wearable device 10 is a higher state than a threshold value. For example, the infection risk detection unit 289 determines that infection risk of a contagious disease is a higher state than the threshold value in a case in which the density of people in the surroundings of the wearable device 10 (or the controller 20) is higher than a predetermined value, or in a case in which the current humidity in the surroundings is lower than a predetermined humidity. Also, the infection risk detection unit 289 determines that infection risk of a contagious disease is a higher state than the threshold value in a case in which the concentration of carbon dioxide in the surroundings of the wearable device 10 (or the controller 20) is higher than a predetermined concentration. In a case in which determination is made that infection risk of a contagious disease is a higher state than the threshold value, the flow advances to step S912. In a case in which determination is made that infection risk of a contagious disease is not a higher state than the threshold value, the flow advances to step S638.

In step S912, the CPU 275 transmits recommendation information recommending the face shield as the usage form (recommending usage of the face shield) to the wearable device 10. Note that the recommendation information may include, along with information recommending the face shield as the usage form, information recommending usage of, for example, protective clothing and a mask along with the wearable device 10.

In this way, in a case in which the infection risk of a contagious disease in the surroundings of the wearable device 10 is a higher state than the threshold value, the CPU 275 determines that the usage form of using the wearable device 10 as a face shield is the recommended usage form thereof. The CPU 275 then transmits the recommendation information recommending the face shield as the usage form to the wearable device 10, and causes the wearable device 10 to notify the user of the recommendation information.

Note that the processing shown in FIG. 9A may be executed between step S510 and step S511, instead of being executed between step S535 and step S536. In this case, the processing shown in FIG. 9B may be executed between step S609 and step S632 instead of being executed between step S637 and step S638.

In the third embodiment, the face shield is recommended as the usage form of the wearable device 10 in a case in which the infection risk is high. Accordingly, the user can use the wearable device 10 as a face shield at an appropriate timing, and thus can be active with a reduced infection risk.

Fourth Embodiment

In a fourth embodiment, the audiovisual system 1 recommending audio output by bone conduction will further be described. Note that in the fourth embodiment, in a case in which the wearable device 10 is displaying images, the wearable device 10 is externally outputting audio corresponding to the image (emitting sound) from the audio output unit 165 or the bone conduction unit 166.

(Processing Performed at Wearable Device) In the control processing of usage form shown in FIG. 5 that the wearable device 10 executes, the processing in the flowchart shown in FIG. 10A is further performed in the fourth embodiment. Specifically, the processing of the flowchart shown in FIG. 10A is executed between step S535 and step S536.

Upon the processing of step S535 ending, in step S1001, the CPU 155 determines whether or not audio is currently being output by the bone conduction unit 166. In a case in which determination is made that audio is being output by the bone conduction unit 166, the flow advances to step S1006. In a case in which determination is made that audio is not being output by the bone conduction unit 166 (i.e., audio is being output by the audio output unit 165), the flow advances to step S1002.

In step S1002, the CPU 155 determines whether or not recommendation information recommending outputting audio by the bone conduction unit 166 as the usage form has been acquired from the controller 20. In a case in which determination is made that recommendation information recommending outputting audio by the bone conduction unit 166 as the usage form has been acquired, the flow advances to step S1003. In a case in which determination is made that recommendation information recommending outputting audio by the bone conduction unit 166 as the usage form has not been acquired, the flow advances to step S1004.

In step S1003, the CPU 155 notifies the user of the recommendation information recommending outputting audio by the bone conduction unit 166 as the usage form. For example, the CPU 155 displays an item indicating recommendation of outputting audio by the bone conduction unit 166 as the usage form on the left-eye display unit 156 and the right-eye display unit 157.

In step S1004, the CPU 155 determines whether or not user operations of selecting output of audio by the bone conduction unit 166 (user operations selecting bone conduction as the mode of audio output) have been performed. In a case in which determination is made that user operations of selecting bone conduction have been performed, the flow advances to step S1005. In a case in which determination is made that user operations of selecting bone conduction have not been performed, the flow advances to step S1007.

In step S1005, the CPU 155 outputs audio from the bone conduction unit 166.

In step S1006, the CPU 155 determines whether or not to end outputting audio from the bone conduction unit 166. In a case in which determination is made to end outputting audio from the bone conduction unit 166, the flow advances to step S1007. In a case in which determination is made not to end outputting audio from the bone conduction unit 166, the flow advances to step S536.

In step S1007, the CPU 155 outputs audio from the audio output unit 165 (emits audio using air vibration).

(Processing Performed at Controller) In the control processing of usage form shown in FIG. 6 that the controller 20 executes, the processing in the flowchart shown in FIG. 10B is further performed in the fourth embodiment. Specifically, the processing of the flowchart shown in FIG. 10B is executed between step S637 and step S638.

Upon the processing of step S637 ending, in step S1011, the CPU 275 controls the boarding detection unit 290 and determines whether or not the user holding the wearable device 10 (controller 20) is on board a train. In a case in which determination is made that the user is on board a train, the flow advances to step S1012. In a case in which determination is made that the user is not on board a train, the flow advances to step S638.

In step S1012, the CPU 275 transmits recommendation information recommending outputting audio from the bone conduction unit 166 to the wearable device 10.

Thus, in a case in which the user is on board a train, the CPU 275 determines that the usage form of outputting audio by bone conduction is the recommended usage form of the wearable device 10. The CPU 275 then transmits recommendation information recommending the usage form of outputting audio by bone conduction (outputting audio from the bone conduction unit 166) to the wearable device 10, and causes the wearable device 10 to notify the user of the recommendation information.

Note that instead of determination regarding whether or not the user is on board a train, determination may be performed regarding whether or not the user is on board some other vehicle (public transport), or whether or not the user is present in a public location such as in a school campus. Determination of the user being on board a particular vehicle (public transport) can be made by, for example, the user moving along a travel route of the particular vehicle, and the speed of travel of the user being no less than a predetermined speed.

Note that the processing shown in FIG. 10A may be executed between step S510 and step S511, instead of being executed between step S535 and step S536. In this case, the processing shown in FIG. 10B may be executed between step S609 and step S632 instead of being executed between step S637 and step S638.

According to the fourth embodiment, in a case in which outputting audio by air vibration may lead to sound leakage to the surroundings and annoy people nearby, outputting audio by bone conduction is recommended. Accordingly, the user can use the wearable device 10 with audio output by bone conduction at an appropriate timing, and thus can be active with a suppressed chance of annoying people nearby.

Fifth Embodiment

Also, upon detecting an oncoming object by the oncoming detection unit 291, the controller 20 may transmit recommendation information recommending a usage form in which the wearable device 10 does not output audio, to the wearable device 10. Upon acquiring the recommendation information recommending the usage form of not outputting audio, the wearable device 10 may notify the user of this recommendation information. An object oncoming means that an object such as a person, animal, vehicle, or the like comes within a predetermined distance to the wearable device 10 (controller 20) or closer.

Once output of audio is stopped by the user who has been notified of the recommendation information, the user can concentrate on comprehending the situation in the surroundings in a case in which there is a possibility of contact between the object and the user. Thus, the user can safely use the wearable device 10.

Note that the controller 20 may control the wearable device 10 to stop output of audio upon the oncoming detection unit 291 detecting an object oncoming, in a case in which the display mode of the wearable device 10 is the optical mode.

Sixth Embodiment

In the sixth embodiment, the wearable device 10 notifies the user of the recommended usage form of the wearable device 10 only in a case in which usage by a user registered in advance is confirmed (identity authentication is successful).

(Processing Performed at Wearable Device) FIG. 11 is a flowchart showing processing of identity authentication performed by the wearable device 10. The processing of the flowchart shown in FIG. 11 is performed prior to starting of the flowchart shown in FIG. 5. The processing of the flowchart shown in FIG. 11 is realized by the CPU 155 executing control programs stored in the program memory 158.

In step S1101, the CPU 155 determines whether or not registration of identity information has been requested by the user. Identity information is information for identifying the user who is the owner of the wearable device 10. In a case in which determination is made that registration of identity information has been requested, the flow advances to step S1102. In a case in which determination is made that registration of identity information has not been requested, the flow advances to step S1105.

In step S1102, the CPU 155 notifies the controller 20 that registration of identity information has been requested (registration request).

In step S1103, the CPU 155 determines whether or not acquisition of identity information has been instructed by the controller 20. In a case in which determination is made that acquisition of identity information has been instructed, the flow advances to step S1104. In a case in which determination is made that acquisition of identity information has not been instructed, the processing of step S1103 is repeated.

In step S1104, the CPU 155 acquires an image by performing image-capturing of the eyes of the user as identity information. The CPU 155 also acquires an optional password from the user. The CPU 155 then transmits the acquired identity information and password to the controller 20.

In step S1105, the CPU 155 determines whether or not identity authentication has been requested from the user. In a case in which determination is made that identity authentication has been requested, the flow advances to step S1106. In a case in which determination is made that identity authentication has not been requested, the flow advances to step S1101.

In step S1106, the CPU 155 notifies the controller 20 that identity authentication has been requested (authentication request).

In step S1107, the CPU 155 determines whether or not acquisition of user information has been instructed from the controller 20. In a case in which determination is made that acquisition of user information has been instructed, the flow advances to step S1108. In a case in which determination is made that acquisition of user information has not been instructed, the processing of step S1107 is repeated.

In step S1108, the CPU 155 acquires the password from the user, and acquires an image of the eyes of the user as user information.

In step S1109, the CPU 155 transmits the password and user information (image of the eyes of the user), acquired in step S1108, to the controller 20.

In step S1110, the CPU 155 determines whether or not identity authentication was successful. In a case in which success of authentication (authentication successful) is notified from the controller 20, the CPU 155 determines that identity authentication was successful. In a case in which failure of authentication (authentication unsuccessful) is notified from the controller 20, the CPU 155 determines that identity authentication was not successful. In a case in which determination is made that identity authentication was successful, the processing of this flowchart ends (processing of the flowchart shown in FIG. 5 begins). In a case in which determination is made that identity authentication was not successful, the flow advances to step S1101.

Figure 12:
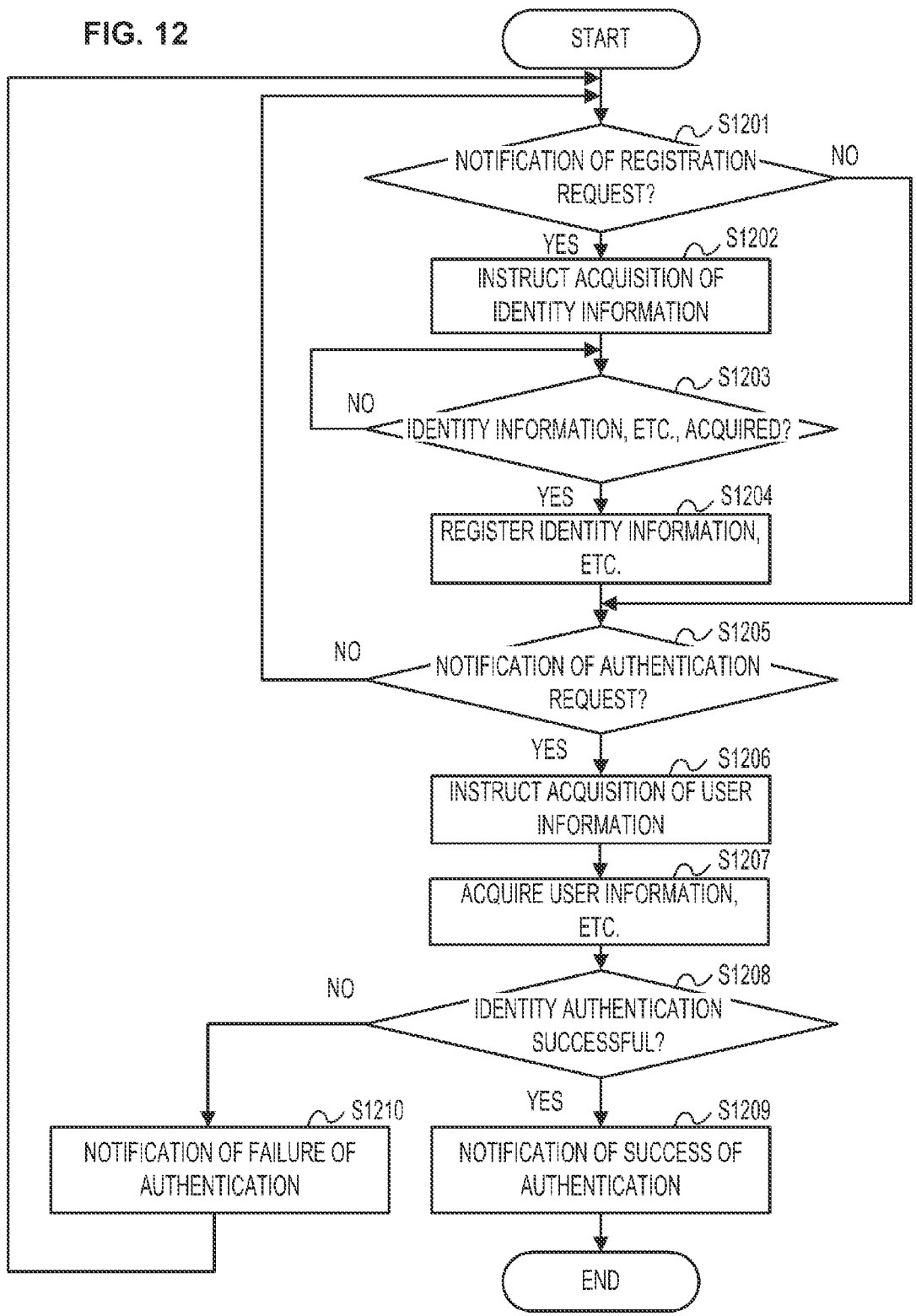
FIG. 12 is a flowchart showing processing performed at a controller according to the sixth embodiment.

(Processing Performed at Controller) FIG. 12 is a flowchart showing processing of identity authentication performed by the controller 20. The processing of the flowchart shown in FIG. 12 is performed prior to starting of the flowchart shown in FIG. 6. The processing of the flowchart shown in FIG. 12 is realized by the CPU 275 executing control programs stored in the program memory 278.

In step S1201, the CPU 275 determines whether or not a request for registration of identity information has been notified from the wearable device 10 (registration request). In a case in which determination is made that registration request for identity information has been notified, the flow advances to step S1202. In a case in which determination is made that registration request for identity information has not been notified, the flow advances to step S1205.

In step S1202, the CPU 275 instructs the wearable device 10 to acquire identity information.

In step S1203, the CPU 275 determines whether or not the identity information and password have been acquired from the wearable device 10. In a case in which determination is made that the identity information and password have been acquired, the flow advances to step S1204. In a case in which determination is made that the identity information and password have not been acquired, the processing of step S1203 is repeated.

In step S1204, the CPU 275 registers the image of the eyes of the user, which is the identity information acquired from the wearable device 10, and the password, in the owner detection unit 292 in a correlated manner. Thus, the user corresponding to the identity information acquired from the wearable device 10 is registered as the owner of the wearable device 10.

In step S1205, the CPU 275 determines whether or not a request for identity authentication (authentication request) has been notified from the wearable device 10. In a case in which determination is made that an authentication request has been notified, the flow advances to step S1206. In a case in which determination is made that an authentication request has not been notified, the flow advances to step S1201.

In step S1206, the CPU 275 instructs the wearable device 10 to acquire user information.

In step S1207, the CPU 275 acquires the user information and password from the wearable device 10.

In step S1208, the CPU 275 controls the owner detection unit 292 to determine whether or not the user information and password acquired in step S1207 match the identity information and password registered in step S1204 (whether or not identity authentication was successful). In a case in which determination is made that these sets of information match (identity authentication was successful), the flow advances to step S1209. In a case in which determination is made that these sets of information do not match, the flow advances to step S1210. Note that the user information and the identity information matching means that characteristics of the eyes in the user information and that characteristics of the eyes in the identity information match.

In step S1209, the CPU 275 notifies the wearable device 10 that authentication was successful (authentication successful).

In step S1210, the CPU 275 notifies the wearable device 10 that authentication failed (authentication unsuccessful). Upon the processing of step S1210 ending, the flow returns to step S1201 again.

Note that instead of the above-described "image of the eyes of the user", optional biometric information by which the user can be identified, such as information of extracted features of an image of the eyes of the user, an image of a fingerprint of the user, information of voice of the user, and so forth, may be used as the identity information and the user information.

Accordingly, the control processing of usage form of the wearable device 10 (processing of FIG. 5) is performed only in a case in which the owner (user) registered in advance is using the wearable device 10. That is to say, in a case in which a person other than the owner (user) registered in advance is using the wearable device 10, recommendation information is not notified from the wearable device 10. Also, the controller 20 does not determine a recommended usage form, and performs control such that the wearable device 10 does not notify the user of the recommendation information. Accordingly, a situation can be prevented in which control processing of the usage form of the wearable device 10 is performed with regard to a user who does not know that control processing of the usage form of the wearable device 10 according to the first through fifth embodiments will be performed. Thus, safety when using the wearable device 10 is improved.

According to the present disclosure, the user can readily comprehend the timing at which to switch the usage form of the wearable device usable in a plurality of usage forms.

Other Embodiments

Although the above-described wearable device 10 is to be worn on the head, the present disclosure is not limited to wearable devices worn on the head. For example, a watch-type wearable device that can be used in a mode in which reception of an email or the like is notified by sound, and a mode where notification is made not by sound but by vibration or the like (plurality of usage forms), and is wearable on the arm, is included in the present disclosure. In this case, the wearable device has a notification unit for notifying the user of recommendation information indicating a recommended usage form out of the plurality of usage forms (e.g., upon detecting that the user has left a room and gone outdoors, recommending the mode of notification by vibration), the recommendation information having been determined on the basis of whether the user is indoors in his/her own room, on a train, or the like, or outdoors (information relating to external environment), for example.

Also, a contact-lens-type wearable device that is usable in a presbyopia correction (vision correction) mode, a mode for displaying digital information in the field of view, a mode for checking the state of health from tear fluid, and so forth (plurality of usage forms), and is wearable on the eyes, is included in the present disclosure. In this case, the wearable device has a notification unit for notifying the user of recommendation information indicating a recommended usage form out of the plurality of usage forms (e.g., recommending turning the mode of displaying digital information in the field of view off upon detecting transition from an awake state to a sleeping state, and transitioning to a mode of checking the state of health from tear fluid), the recommendation information having been determined on the basis of, for example, whether the user is in an awake state (active outdoors) or a sleeping state (sleeping indoors).

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-194334, filed on Nov. 30, 2021, which is hereby incorporated by reference herein in its entirety.

What is claimed is:

1. A wearable device that is usable in a plurality of usage forms and that is worn on a head of a user, the wearable device comprising:
   a display;
   at least one memory storing instructions; and
   at least one processor which, upon execution of the stored instructions configures the at least one processor to function as
   a notification unit configured to notify the user, via the display, of recommendation information indicating a recommended usage form out of the plurality of usage forms, the usage forms being determined by at least one of display mode and form of the wearable device, the recommendation information being information determined based on information relating to an external environment.

2. The wearable device according to claim 1, wherein the plurality of usage forms include a first mode in which the wearable device enables the user to visually perceive an external space transparently through the display, and a second mode in which the wearable device does not allow the user to visually perceive the external space transparently through the display.

3. The wearable device according to claim 2, wherein the notification unit notifies the user of information recommending the first mode as the recommendation information when the wearable device is operating in the second mode, and the information relating to the external environment indicates that the wearable device transitions from a state of being used indoors to a state of being used outdoors.

4. The wearable device according to claim 2, wherein the notification unit notifies the user of information recommending the first mode as the recommendation information, when the wearable device is operating in the second mode, and the information relating to the external environment indicates that the user of the wearable device transitions from a stopped state to a state where the user is moving.

5. The wearable device according to claim 2, wherein the display displays an image in the second mode, and the notification unit notifies the user of information recommending the first mode as the recommendation information, when the information relating to the external environment indicates that the wearable device that is operating in the second mode transitions from a state of being used by the user that is stationary indoors to a state of being used outdoors or to a state of being used by the user that is moving.

6. The wearable device according to claim 2, wherein the display displays an image in the second mode, and when the wearable device operating in the first mode, the display switches between displaying an image at a first size or displaying the image at a reduced size based on information relating to the external environment.

7. The wearable device according to claim 1, wherein the plurality of usage forms include a usage form in which the wearable device is used as a face shield, and the notification unit notifies the user of information recommending the usage form of the face shield, as the recommendation information, when the information relating to the external environment indicates that an infection risk of a contagious disease in an area surrounding the wearable device is higher than a threshold value.

8. The wearable device according to claim 7, wherein when the information relating to the external environment indicates that the infection risk of the contagious disease in an area surrounding the wearable device is higher than the threshold value is
when a density of people the area surrounding the wearable device is higher than a predetermined value, when humidity in the area surrounding the wearable device is lower than a predetermined humidity, or when a concentration of carbon dioxide the area surrounding the wearable device is higher than a predetermined concentration.

9. The wearable device according to claim 1, further comprising
   a bone conduction unit configured to output audio by bone conduction, and
   an audio output unit configured to output audio by air vibration,
   wherein
   the plurality of usage forms include a usage form of outputting audio by the bone conduction unit, and a usage form of outputting audio by the audio output unit, and
   the notification unit notifies the user of information recommending the usage form in which audio is output from the bone conduction unit, as the recommendation information, in a case in which audio is being output by the audio output unit, and the user is on board a particular vehicle.

10. The wearable device according to claim 1, wherein execution of the stored instructions further configures the at least one processor to function as
a detecting unit configured to detect a position at which the user is looking, and
a control unit configured to, upon detecting that the user is continuously looking at a predetermined region of a item for a predetermined amount of time, set the usage form of the wearable device to the recommended usage form.

11. The wearable device according to claim 1, wherein the notification unit notifies the user of information recommending a usage form in which audio is not output as the recommendation information, when an object is approaching and within a predetermined distance of the wearable device.

12. The wearable device according to claim 1, wherein the notification unit does not notify the user of the recommendation information when the user of the wearable device is not a registered owner.

13. A control device that controls a wearable device having a display that is usable in a plurality of usage forms and that is worn on a head of a user, the control device comprising:
at least one memory storing instructions; and
at least one processor which, upon execution of the stored instructions, is configured to function as
a determining unit configured to determine a recommended usage form out of the plurality of usage forms based on information relating to an external environment, the usage forms being determined by at least one of display mode and form of the wearable device, and
a control unit configured to control the wearable device to notify the user of information indicating the recommended usage form via the display.

14. The control device according to claim 13, wherein the plurality of usage forms include a first mode in which the wearable device enables the user to visually perceive an external space transparently through the display, and a second mode in which the wearable device does not allow user to visually perceive the external space transparently through the display.

15. The control device according to claim 14, wherein the determining unit determines that the first mode is the recommended usage form, when the wearable device is operating in the second mode, and the information relating to the external environment indicates that the wearable device transitions from a state of being used indoors to a state of being used outdoors.

16. The control device according to claim 14, wherein the determining unit determines that the first mode is the recommended usage form, when the wearable device is operating in the second mode, and the information relating to the external environment indicates that the user of the wearable device transitions from a stopped state to a state where the user is moving.

17. The control device according to claim 14, wherein the display displays an image in the second mode, and the determining unit determines that the first mode is the recommended usage form, when the information relating to the external environment indicates that the wearable device that is operating in the second mode transitions from a state of being used by the user that is stationary indoors to a state of being used outdoors or a state of being used by the user that is moving.

18. The control device according to claim 14, wherein the display displays an image in the second mode, and when the wearable device operating in the first mode, the control unit controls the wearable device to switch between displaying an image at a first size or displaying the image at a reduced size based on information relating to the external environment.

19. The control device according to claim 13, wherein the plurality of usage forms include a usage form in which the wearable device is used as a face shield, and
the determining unit determines that the usage form of the face shield is the recommended usage form, when the information relating to the external environment indicates that an infection risk of a contagious disease in an area surrounding the wearable device is higher than a threshold value.

20. The control device according to claim 19, wherein when the information relating to the external environment indicates that the infection risk of the contagious disease in an area surrounding the wearable device is higher than the threshold value is
when a density of people the area surrounding the wearable device is higher than a predetermined value, when humidity in the area surrounding the wearable device is lower than a predetermined humidity, or when a concentration of carbon dioxide the area surrounding the wearable device is higher than a predetermined concentration.

21. The control device according to claim 13, wherein the wearable device has 1) a bone conduction unit configured to output audio by bone conduction, and 2) an audio output unit configured to output audio by air vibration,
the plurality of usage forms include a usage form of outputting audio by the bone conduction unit, and a usage form of outputting audio by the audio output unit, and
the determining unit determines that the usage form in which audio is output from the bone conduction unit is the recommended usage form, in a case in which audio is being output by the audio output unit, and the user is on board a particular vehicle.

22. The control device according to claim 13, wherein the determining unit determines that a usage form in which audio is not output is the recommended usage form, in a case in which an object is oncoming within a predetermined distance from the wearable device.

23. The control device according to claim 13, wherein the determining unit acquires, from the wearable device, information indicating the plurality of usage forms that are usable by the wearable device, and determines the recommended usage form on a basis of the information indicating the plurality of usage forms.

24. The control device according to claim 13, wherein the at least one memory and the at least one processor further function as an authentication unit configured to authenticate whether or not the user of the wearable device is an owner of the wearable device registered in advance, and
the control unit controls the wearable device to not notify the user of the information indicating the recommended usage form in a case in which the user of the wearable device is not the owner.

25. A system comprising:
a wearable device having a display that is usable in a plurality of usage forms and that is worn on a head of a user; and
a control device that controls the wearable device to determine a recommended usage form out of the plurality of usage forms based on information relating to an external environment, the usage forms being determined by at least one of display mode and form of the wearable device, and notify the user, via the display, of information indicating the recommended usage form.

26. A control method of a wearable device having a display that is usable in a plurality of usage forms and that is worn on a head of a user, the control method comprising:
  acquiring information indicating a recommended usage form out of the plurality of usage forms, the information determined based on information relating to an external environment, the usage forms being determined by at least one of display mode and form of the wearable device; and
  notifying the user of the information indicating the recommended usage form via the display.

27. A control method of a wearable device having a display that is usable in a plurality of usage forms and that is worn on a head of a user, the control method comprising:
  determining a recommended usage form out of the plurality of usage forms based on information relating to an external environment, the usage forms being determined by at least one of display mode and form of the wearable device; and
  controlling the wearable device to notify the user of information indicating the recommended usage form via the display.

28. A control method of a system that has 1) a wearable device having a display that is usable in a plurality of usage forms and that is worn on a head of a user, and 2) a control device that controls the wearable device, the control method comprising:
  determining a recommended usage form out of the plurality of usage forms based on information relating to an external environment, the usage forms being determined by at least one of display mode and form of the wearable device; and
  notifying the user of information indicating the recommended usage form via the display.

29. A non-transitory computer readable medium that stores a program, wherein the program causes a computer to execute a control method of a wearable device having a display that is usable in a plurality of usage forms and that is worn on a head of a user, the control method including
  acquiring information indicating a recommended usage form out of the plurality of usage forms, the information determined based on information relating to an external environment, the usage forms being determined by at least one of display mode and form of the wearable device, and
  notifying the user of the information indicating the recommended usage form via the display.

30. A non-transitory computer readable medium that stores a program, wherein the program causes a computer to execute a control method of a wearable device having a display that is usable in a plurality of usage forms and that is worn on a head of a user, the control method including
  determining a recommended usage form out of the plurality of usage forms based on information relating to an external environment, the usage forms being determined by at least one of display mode and form of the wearable device, and
  controlling the wearable device to notify the user of information indicating the recommended usage form via the display.

31. A non-transitory computer readable medium that stores a program, wherein the program causes a computer to execute a control method of a system that has 1) a wearable device having a display that is usable in a plurality of usage forms and that is worn on a head of a user, and 2) a control device that controls the wearable device, the control method including
  determining a recommended usage form out of the plurality of usage forms based on information relating to an external environment, the usage forms being determined by at least one of display mode and form of the wearable device, and
  notifying the user of information indicating the recommended usage form via the display.

* * * * *